(12) United States Patent
Kim et al.

(10) Patent No.: US 12,022,406 B2
(45) Date of Patent: Jun. 25, 2024

(54) METHOD FOR TRANSMITTING AND RECEIVING UPLINK REFERENCE SIGNAL FOR POSITIONING, AND DEVICE THEREFOR

(71) Applicant: LG ELECTRONICS INC., Seoul (KR)

(72) Inventors: Youngsub Kim, Seoul (KR); Kijun Kim, Seoul (KR); Hyunsu Cha, Seoul (KR); Sukhyon Yoon, Seoul (KR); Hyunsoo Ko, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 396 days.

(21) Appl. No.: 17/427,767

(22) PCT Filed: Nov. 28, 2019

(86) PCT No.: PCT/KR2019/016605
§ 371 (c)(1),
(2) Date: Aug. 2, 2021

(87) PCT Pub. No.: WO2020/166797
PCT Pub. Date: Aug. 20, 2020

(65) Prior Publication Data
US 2022/0124636 A1    Apr. 21, 2022

(30) Foreign Application Priority Data
Feb. 11, 2019 (KR) .................. 10-2019-0015663

(51) Int. Cl.
*H04W 52/32* (2009.01)
*H04W 52/14* (2009.01)
(Continued)

(52) U.S. Cl.
CPC ......... *H04W 52/325* (2013.01); *H04W 52/14* (2013.01); *H04W 52/24* (2013.01); *H04W 64/00* (2013.01)

(58) Field of Classification Search
CPC ............... H04W 52/42; H04W 72/21; H04W 52/228; H04W 72/046; H04W 52/346;
(Continued)

(56) References Cited

U.S. PATENT DOCUMENTS 10,728,859 B2 * 7/2020 Kim ................... H04W 52/365
2010/0285762 A1 * 11/2010 Ko ........................ H04L 5/0048
455/127.1
2013/0033999 A1 * 2/2013 Siomina ............... H04W 64/00
370/252
(Continued)

FOREIGN PATENT DOCUMENTS

EP         2770785 B1   6/2016
KR       101587680 B1   1/2016

*Primary Examiner* — Lana N Le
(74) *Attorney, Agent, or Firm* — BRYAN CAVE LEIGHTON PAISNER LLP

(57) ABSTRACT

The present disclosure discloses a method for transmitting, by a terminal, an uplink reference signal for positioning in a wireless communication system. In particular, the above disclosure comprises: determining a first power value for a first uplink reference signal and a second power value for a second uplink reference signal; transmitting the first uplink reference signal through a first resource on the basis of the first power value; and transmitting the second uplink reference signal through a second resource on the basis of the second power value, wherein the first power value and the second power value may be different from each other, and the first resource and the second resource may be different from each other.

13 Claims, 26 Drawing Sheets

(51) Int. Cl.
*H04W 52/24* (2009.01)
*H04W 64/00* (2009.01)

(58) Field of Classification Search
CPC ............... H04W 72/20; H04W 74/004; H04W 52/241; H04W 52/16; H04W 52/36; H04W 52/245; H04W 72/0473; H04W 72/1268; H04W 72/12; H04W 72/0446; H04W 16/06; H04W 72/0453; H04W 52/243; H04W 72/04; H04W 52/18; H04W 52/327; H04W 52/28; H04W 52/0209; H04W 72/00; H04W 16/10; H04W 52/44; H04W 72/54; H04W 72/542; H04W 76/15; H04W 52/325; H04W 52/14; H04W 52/24; H04W 64/00; H04W 52/242; H04W 52/367; H04W 52/146

See application file for complete search history.

(56) References Cited

U.S. PATENT DOCUMENTS

| | | | |
|---|---|---|---|
| 2014/0219152 A1 | 8/2014 | Anto et al. | |
| 2015/0043465 A1 | 2/2015 | Ouchi | |
| 2015/0382290 A1* | 12/2015 | Yaacoub | ............... H04W 16/10 370/311 |
| 2017/0347322 A1 | 11/2017 | Lee et al. | |
| 2019/0305866 A1* | 10/2019 | Lindoff | ................ H04J 11/0056 |
| 2020/0314770 A1* | 10/2020 | Wu | ........................... H04L 5/10 |
| 2020/0367238 A1* | 11/2020 | Guan | ................ H04W 72/0446 |
| 2022/0015154 A1* | 1/2022 | Wu | ....................... H04W 74/08 |

* cited by examiner (A) CONTROL-PLANE PROTOCOL STACK (B) USER-PLANE PROTOCOL STACK (a)

(b)

METHOD FOR TRANSMITTING AND RECEIVING UPLINK REFERENCE SIGNAL FOR POSITIONING, AND DEVICE THEREFOR

This application is the National Stage filing under 35 U.S.C. 371 of International Application No. PCT/KR2019/016605 filed on Nov. 28, 2019, which claims priority to Korean Patent Application No. 10-2019-0015663 filed on Feb. 11, 2019, the contents of which are all hereby incorporated by reference herein in their entirety.

TECHNICAL FIELD

The present disclosure relates to a method for transmitting and receiving uplink reference signals for positioning and a device for the same, and more particularly to a method and device for transmitting and receiving an Uplink Positioning Reference Signal (UL-PRS) and a Sounding Reference Signal (SRS) by adjusting power for the UL-PRS (Uplink Positioning Reference Signal)/SRS(Sounding Reference Signal).

BACKGROUND ART

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).\

DISCLOSURE

Technical Problem

An object of the present disclosure is to provide a method and device for transmitting and receiving uplink reference signals for positioning.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

In accordance with an aspect of the present disclosure, a method for enabling a user equipment (UE) to transmit an uplink (UL) reference signal for positioning in a wireless communication system may include determining a first power value for a first uplink (UL) reference signal and a second power value for a second uplink (UL) reference signal; transmitting the first uplink (UL) reference signal through a first resource based on the first power value; and transmitting the second uplink (UL) reference signal through a second resource based on the second power value, wherein, the first power value and the second power value are different from each other; and the first resource and the second resource are different from each other.

The first power value may be determined based on a pathloss value of a serving cell, and the second power value may be maximum power of the user equipment (UE).

The first power value may be determined based on a pathloss value of a serving cell, and the second power value may be determined based on a pathloss value of a base station (BS) located farthest from the user equipment (UE).

The first power value may be determined based on a pathloss value of a base station (BS) located closest to the user equipment (UE), and the second power value may be maximum power of the user equipment (UE).

The first power value may be determined based on a pathloss value of a base station (BS) located closest to the user equipment (UE), and the second power value may be determined based on a pathloss value of a base station (BS) located farthest from the user equipment (UE).

The method may further include determining a third power value for a third uplink (UL) reference signal, wherein, the third power value is different from the first power value and the second power value, and a third resource for the third uplink (UL) reference signal is different from the first resource and the second resource.

The first power value may be determined based on a pathloss value of a base station (BS) located closest to the user equipment (UE), the second power value may be determined based on a pathloss value of a serving cell, and the third power value may be maximum power of the user equipment (UE).

The first power value may be determined based on a pathloss value of a base station (BS) located closest to the user equipment (UE), the second power value may be determined based on a pathloss value of a serving cell, and the third power value may be determined based on a pathloss value of a base station (BS) located farthest from the user equipment (UE).

Uplink (UL) signals other than the second uplink (UL) reference signal may be muted in the second resources.

The first uplink (UL) reference signal may be used for at least one first base station (BS) located within a predetermined distance from the user equipment (UE), and the second uplink (UL) reference signal may be used for at least one second base station (BS) located outside the predetermined distance from the user equipment (UE).

Each of the first uplink (UL) reference signal and the second uplink (UL) reference signal may be an Uplink Positioning Reference Signal (UL-PRS) or a Sounding Reference Signal (SRS).

The user equipment (UE) may be configured to communicate with at least one of another user equipment (UE) other than the UE, a network, a base station (BS), and an autonomous vehicle.

In accordance with another aspect of the present disclosure, a device configured to transmit an uplink (UL) reference signal for positioning in a wireless communication system may include at least one processor, and at least one memory operatively connected to the at least one processor, and configured to store instructions such that the at least one processor performs specific operations by executing the instructions. The specific operations may include determining a first power value for a first uplink (UL) reference signal and a second power value for a second uplink (UL) reference signal, transmitting the first uplink (UL) reference signal through a first resource based on the first power value, and transmitting the second uplink (UL) reference signal through a second resource based on the second power value. The first power value and the second power value may be different from each other, and the first resource and the second resource may be different from each other.

In accordance with another aspect of the present disclosure, a user equipment (UE) configured to transmit an uplink (UL) reference signal for positioning in a wireless communication system may include at least one transceiver, at least one processor; and at least one memory operatively connected to the at least one processor, and configured to store instructions such that the at least one processor performs specific operations by executing the instructions. The specific operations may include determining a first power value for a first uplink (UL) reference signal and a second power value for a second uplink (UL) reference signal, transmitting, by the at least one transceiver, the first uplink (UL) reference signal through a first resource based on the first power value, and transmitting, by the at least one transceiver, the second uplink (UL) reference signal through a second resource based on the second power value. The first power value and the second power value may be different from each other, and the first resource and the second resource may be different from each other.

Advantageous Effects

As is apparent from the above description, the embodiments of the present disclosure can effectively transmit UL-PRS (Uplink Positioning Reference Signal)/SRS (Sounding Reference Signal) to a plurality of TPs/BSs (i.e., Transmission Points (TPs)/Base Stations (BSs)).

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BEST MODE

Figure 1:
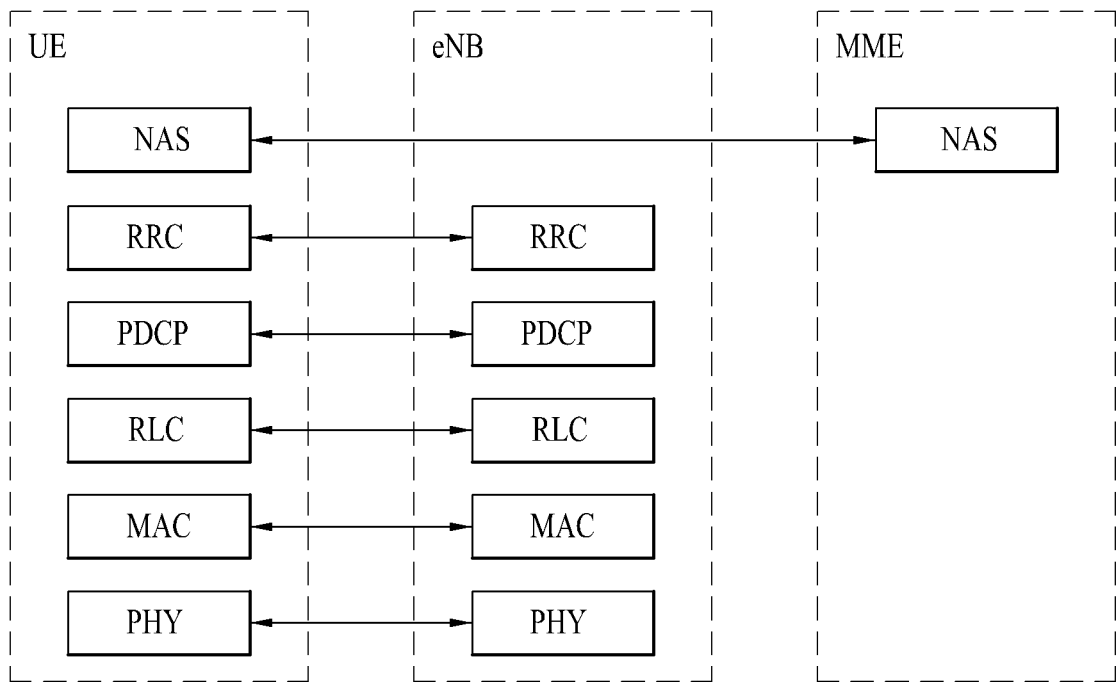
FIG. 1 is a diagram illustrating the control-plane and user-plane architecture of radio interface protocols between a user equipment (UE) and an evolved UMTS terrestrial radio access network (E-UTRAN) in conformance to a $3^{rd}$ generation partnership project (3GPP) radio access network standard
Figure 1:
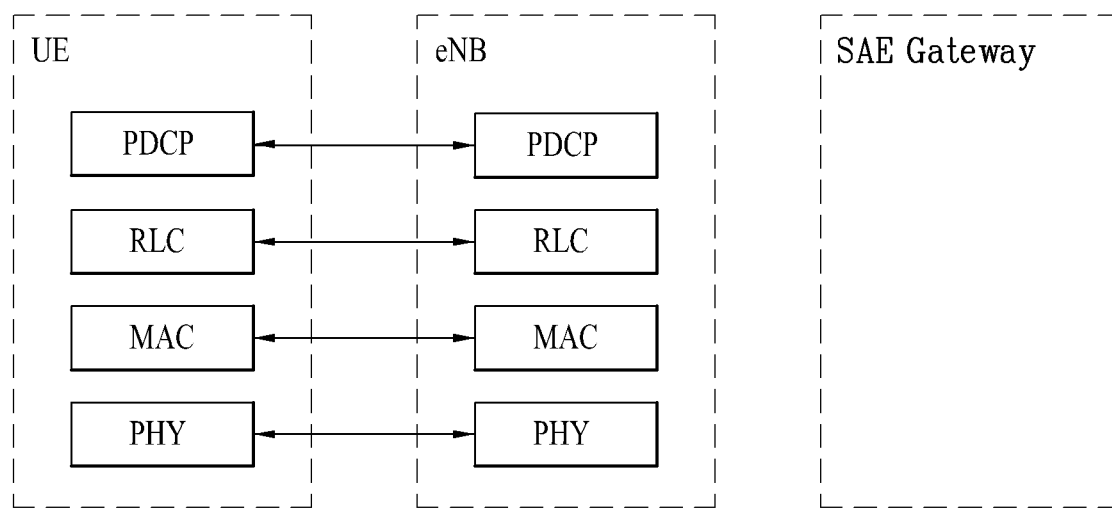

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd generation partnership project (3GPP) system.

While embodiments of the present disclosure are described in the context of long term evolution (LTE) and LTE-advanced (LTE-A) systems, they are purely exemplary. Therefore, the embodiments of the present disclosure are applicable to any other communication system as long as the above definitions are valid for the communication system.

The term, base station (BS) may be used to cover the meanings of terms including remote radio head (RRH), evolved Node B (eNB or eNode B), transmission point (TP), reception point (RP), relay, and so on.

The 3GPP communication standards define downlink (DL) physical channels corresponding to resource elements (REs) carrying information originated from a higher layer, and DL physical signals which are used in the physical layer and correspond to REs which do not carry information originated from a higher layer. For example, physical downlink shared channel (PDSCH), physical broadcast channel (PBCH), physical multicast channel (PMCH), physical control format indicator channel (PCFICH), physical downlink control channel (PDCCH), and physical hybrid ARQ indicator channel (PHICH) are defined as DL physical channels, and reference signals (RSs) and synchronization signals (SSs) are defined as DL physical signals. An RS, also called a pilot signal, is a signal with a predefined special waveform known to both a gNode B (gNB) and a user equipment (UE). For example, cell specific RS, UE-specific RS (UE-RS), positioning RS (PRS), and channel state information RS (CSI-RS) are defined as DL RSs. The 3GPP LTE/LTE-A standards define uplink (UL) physical channels corresponding to REs carrying information originated from a higher layer, and UL physical signals which are used in the physical layer and correspond to REs which do not carry information originated from a higher layer. For example, physical uplink shared channel (PUSCH), physical uplink control channel (PUCCH), and physical random access channel (PRACH) are defined as UL physical channels, and a demodulation reference signal (DMRS) for a UL control/data signal, and a sounding reference signal (SRS) used for UL channel measurement are defined as UL physical signals.

In the present disclosure, the PDCCH/PCFICH/PHICH/PDSCH refers to a set of time-frequency resources or a set of REs, which carry downlink control information (DCI)/a control format indicator (CFI)/a DL acknowledgement/negative acknowledgement (ACK/NACK)/DL data. Further, the PUCCH/PUSCH/PRACH refers to a set of time-frequency resources or a set of REs, which carry UL control information (UCI)/UL data/a random access signal. In the present disclosure, particularly a time-frequency resource or an RE which is allocated to or belongs to the PDCCH/PCFICH/PHICH/PDSCH/PUCCH/PUSCH/PRACH is referred to as a PDCCH RE/PCFICH RE/PHICH RE/PDSCH RE/PUCCH RE/PUSCH RE/PRACH RE or a PDCCH resource/PCFICH resource/PHICH resource/PDSCH resource/PUCCH resource/PUSCH resource/PRACH resource. Hereinbelow, if it is said that a UE transmits a PUCCH/PUSCH/PRACH, this means that UCI/UL data/a random access signal is transmitted on or through the PUCCH/PUSCH/PRACH. Further, if it is said that a gNB transmits a PDCCH/PCFICH/PHICH/PDSCH, this means that DCI/control information is transmitted on or through the PDCCH/PCFICH/PHICH/PDSCH.

Hereinbelow, an orthogonal frequency division multiplexing (OFDM) symbol/carrier/subcarrier/RE to which a CRS/DMRS/CSI-RS/SRS/UE-RS is allocated to or for which the CRS/DMRS/CSI-RS/SRS/UE-RS is configured is referred to as a CRS/DMRS/CSI-RS/SRS/UE-RS symbol/carrier/subcarrier/RE. For example, an OFDM symbol to which a tracking RS (TRS) is allocated or for which the TRS is configured is referred to as a TRS symbol, a subcarrier to which a TRS is allocated or for which the TRS is configured is referred to as a TRS subcarrier, and an RE to which a TRS is allocated or for which the TRS is configured is referred to as a TRS RE. Further, a subframe configured to transmit a TRS is referred to as a TRS subframe. Further, a subframe carrying a broadcast signal is referred to as a broadcast subframe or a PBCH subframe, and a subframe carrying a synchronization signal (SS) (e.g., a primary synchronization signal (PSS) and/or a secondary synchronization signal (SSS)) is referred to as an SS subframe or a PSS/SSS subframe. An OFDM symbol/subcarrier/RE to which a PSS/SSS is allocated or for which the PSS/SSS is configured is referred to as a PSS/SSS symbol/subcarrier/RE.

In the present disclosure, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna port configured to transmit CRSs may be distinguished from each other by the positions of REs occupied by the CRSs according to CRS ports, antenna ports configured to transmit UE-RSs may be distinguished from each other by the positions of REs occupied by the UE-RSs according to UE-RS ports, and antenna ports configured to transmit CSI-RSs may be distinguished from each other by the positions of REs occupied by the CSI-RSs according to CSI-RS ports. Therefore, the term CRS/UE-RS/CSI-RS/TRS port is also used to refer to a pattern of REs occupied by a CRS/UE-RS/CSI-RS/TRS in a predetermined resource area.

<Artificial Intelligence (AI)>

AI refers to the field of studying AI or methodology for making the same, and machine learning refers to the field of defining various issues dealt with in the AI field and studying methodology for solving the various issues. The machine learning is defined as an algorithm that enhances the performance of a certain task through consistent experiences with the task.

An artificial neural network (ANN) is a model used in the machine learning and may mean a whole model of problem-solving ability which is composed of artificial neurons (nodes) that form a network by synaptic connections. The ANN may be defined by a connection pattern between neurons in different layers, a learning process for updating model parameters, and an activation function for generating an output value.

The ANN may include an input layer, an output layer, and optionally one or more hidden layers. Each layer includes one or more neurons, and the ANN may include a synapse that links neurons. In the ANN, each neuron may output the function value of the activation function for input signals, weights, and bias input through the synapse.

The model parameter refers to a parameter determined through learning and includes the weight value of a synaptic connection and the bias of a neuron. A hyperparameter means a parameter to be set in the machine learning algorithm before learning and includes a learning rate, a repetition number, a mini-batch size, and an initialization function.

The purpose of the learning of the ANN may be to determine the model parameter that minimizes a loss function. The loss function may be used as an index to determine the optimal model parameter in the learning process of the ANN.

Machine learning may be classified into supervised learning, unsupervised learning, and reinforcement learning according to learning mechanisms.

The supervised learning may refer to a method of training the ANN in a state that labels for learning data are given, and the label may mean a correct answer (or result value) that the ANN must infer when the learning data is input to the ANN. The unsupervised learning may refer to a method of training the ANN in a state that labels for learning data are not given. The reinforcement learning may refer to a method of learning an agent defined in a certain environment to select a behavior or a behavior sequence that maximizes cumulative compensation in each state.

Machine learning implemented with a deep neural network (DNN) including a plurality of hidden layers among ANNs is referred to as deep learning. The deep running is part of the machine running. The machine learning used herein includes the deep running.

<Robot>

A robot may refer to a machine that automatically processes or operates a given task based on its own ability. In particular, a robot having a function of recognizing an environment and making a self-determination may be referred to as an intelligent robot.

Robots may be classified into industrial robots, medical robots, home robots, military robots, etc. according to use purposes or fields.

The robot may include a driving unit having an actuator or a motor and perform various physical operations such as moving a robot joint. In addition, a movable robot may include a driving unit having a wheel, a brake, a propeller, etc. and may travel on the ground or fly in the air through the driving unit.

<Autonomous Driving (Self-Driving)>

Autonomous driving refers to a technique of driving by itself. An autonomous driving vehicle refers to a vehicle moving with no user manipulation or with minimum user manipulation.

For example, the autonomous driving may include a technology for maintaining a current lane, a technology for automatically adjusting a speed such as adaptive cruise control, a technique for automatically moving along a predetermined route, and a technology for automatically setting a route and traveling along the route when a destination is determined.

The vehicle may include a vehicle having only an internal combustion engine, a hybrid vehicle having an internal combustion engine and an electric motor together, and an electric vehicle having only an electric motor. Further, the vehicle may include not only an automobile but also a train, a motorcycle, etc.

The autonomous driving vehicle may be regarded as a robot having the autonomous driving function.

<Extended Reality (XR)>

Extended reality is collectively referred to as virtual reality (VR), augmented reality (AR), and mixed reality (MR). The VR technology provides real-world objects and backgrounds as CG images, the AR technology provides virtual CG images on real object images, and the MR technology is a computer graphic technology of mixing and combining virtual objects with the real world.

The MR technology is similar to the AR technology in that real and virtual objects are shown together. However, the MR technology is different from the AR technology in that the AR technology uses virtual objects to complement real objects, whereas the MR technology deal with virtual and real objects in the same way.

The XR technology may be applied to a HMD, a head-up display (HUD), a mobile phone, a tablet PC, a laptop computer, a desktop computer, a TV, a digital signage, etc. A device to which the XR technology is applied may be referred to as an XR device.

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup can be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates control-plane and user-plane protocol stacks in a radio interface protocol architecture conforming to a 3GPP wireless access network standard between a UE and an evolved UMTS terrestrial radio access network (E-UTRAN). The control plane is a path in which the UE and the E-UTRAN transmit control messages to manage calls, and the user plane is a path in which data generated from an application layer, for example, voice data or Internet packet data is transmitted.

A physical (PHY) layer at layer 1 (L1) provides information transfer service to its higher layer, a medium access control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in orthogonal frequency division multiple access (OFDMA) for downlink (DL) and in single carrier frequency division multiple access (SC-FDMA) for uplink (UL).

The MAC layer at layer 2 (L2) provides service to its higher layer, a radio link control (RLC) layer via logical channels. The RLC layer at L2 supports reliable data transmission. RLC functionality may be implemented in a function block of the MAC layer. A packet data convergence protocol (PDCP) layer at L2 performs header compression to reduce the amount of unnecessary control information and thus efficiently transmit Internet protocol (IP) packets such as IP version 4 (IPv4) or IP version 6 (IPv6) packets via an air interface having a narrow bandwidth.

A radio resource control (RRC) layer at the lowest part of layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a broadcast channel (BCH) carrying system information, a paging channel (PCH) carrying a paging message, and a shared channel (SCH) carrying user traffic or a control message. DL multicast traffic or control messages or DL broadcast traffic or control messages may be transmitted on a DL SCH or a separately defined DL multicast channel (MCH). UL transport channels used to deliver data from a UE to the E-UTRAN include a random access channel (RACH) carrying an initial control message and a UL SCH carrying user traffic or a control message. Logical channels that are defined above transport channels and mapped to the transport channels include a broadcast control channel (BCCH), a paging control channel (PCCH), a Common Control Channel (CCCH), a multicast control channel (MCCH), a multicast traffic channel (MTCH), etc.

Figure 2:
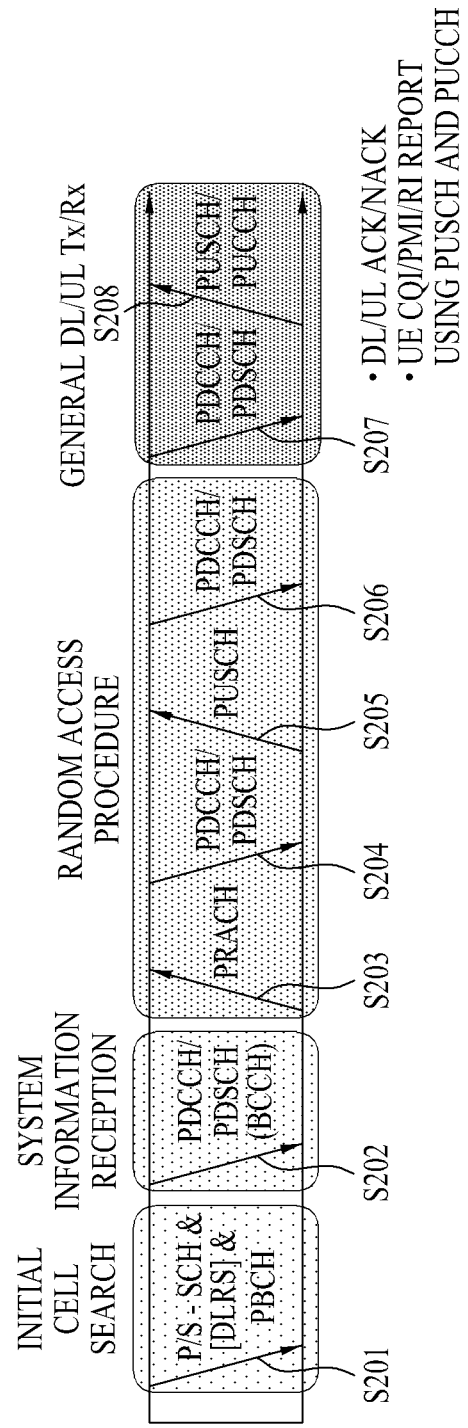
FIG. 2 is a diagram illustrating physical channels and a general signal transmission method using the physical channels in a 3GPP system.

FIG. 2 illustrates physical channels and a general method for transmitting signals on the physical channels in the 3GPP system.

Referring to FIG. 2, when a UE is powered on or enters a new cell, the UE performs initial cell search (S201). The initial cell search involves acquisition of synchronization to an eNB. Specifically, the UE synchronizes its timing to the eNB and acquires a cell identifier (ID) and other information by receiving a primary synchronization channel (P-SCH) and a secondary synchronization channel (S-SCH) from the eNB. Then the UE may acquire information broadcast in the cell by receiving a physical broadcast channel (PBCH) from the eNB. During the initial cell search, the UE may monitor a DL channel state by receiving a downlink reference signal (DL RS).

After the initial cell search, the UE may acquire detailed system information by receiving a physical downlink control channel (PDCCH) and receiving a physical downlink shared channel (PDSCH) based on information included in the PDCCH (S202).

If the UE initially accesses the eNB or has no radio resources for signal transmission to the eNB, the UE may perform a random access procedure with the eNB (S203 to S206). In the random access procedure, the UE may transmit a predetermined sequence as a preamble on a physical random access channel (PRACH) (S203 and S205) and may receive a response message to the preamble on a PDCCH and a PDSCH associated with the PDCCH (S204 and S206). In the case of a contention-based RACH, the UE may additionally perform a contention resolution procedure.

After the above procedure, the UE may receive a PDCCH and/or a PDSCH from the eNB (S207) and transmit a physical uplink shared channel (PUSCH) and/or a physical uplink control channel (PUCCH) to the eNB (S208), which is a general DL and UL signal transmission procedure. Particularly, the UE receives downlink control information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL acknowledgment/negative acknowledgment (ACK/NACK) signal, a channel quality indicator (CQI), a precoding matrix index (PMI), a rank indicator (RI), etc. In the 3GPP LTE system, the UE may transmit control information such as a CQI, a PMI, an RI, etc. on a PUSCH and/or a PUCCH.

The use of an ultra-high frequency band, that is, a millimeter frequency band at or above 6 GHz is under consideration in the NR system to transmit data in a wide frequency band, while maintaining a high transmission rate for multiple users. The 3GPP calls this system NR. In the present disclosure, the system will also be referred to as an NR system.

The NR system adopts the OFDM transmission scheme or a similar transmission scheme. Specifically, the NR system may use OFDM parameters different from those in LTE. Further, the NR system may follow the legacy LTE/LTE-A numerology but have a larger system bandwidth (e.g., 100 MHz). Further, one cell may support a plurality of numerologies in the NR system. That is, UEs operating with different numerologies may coexist within one cell.

Figure 3:
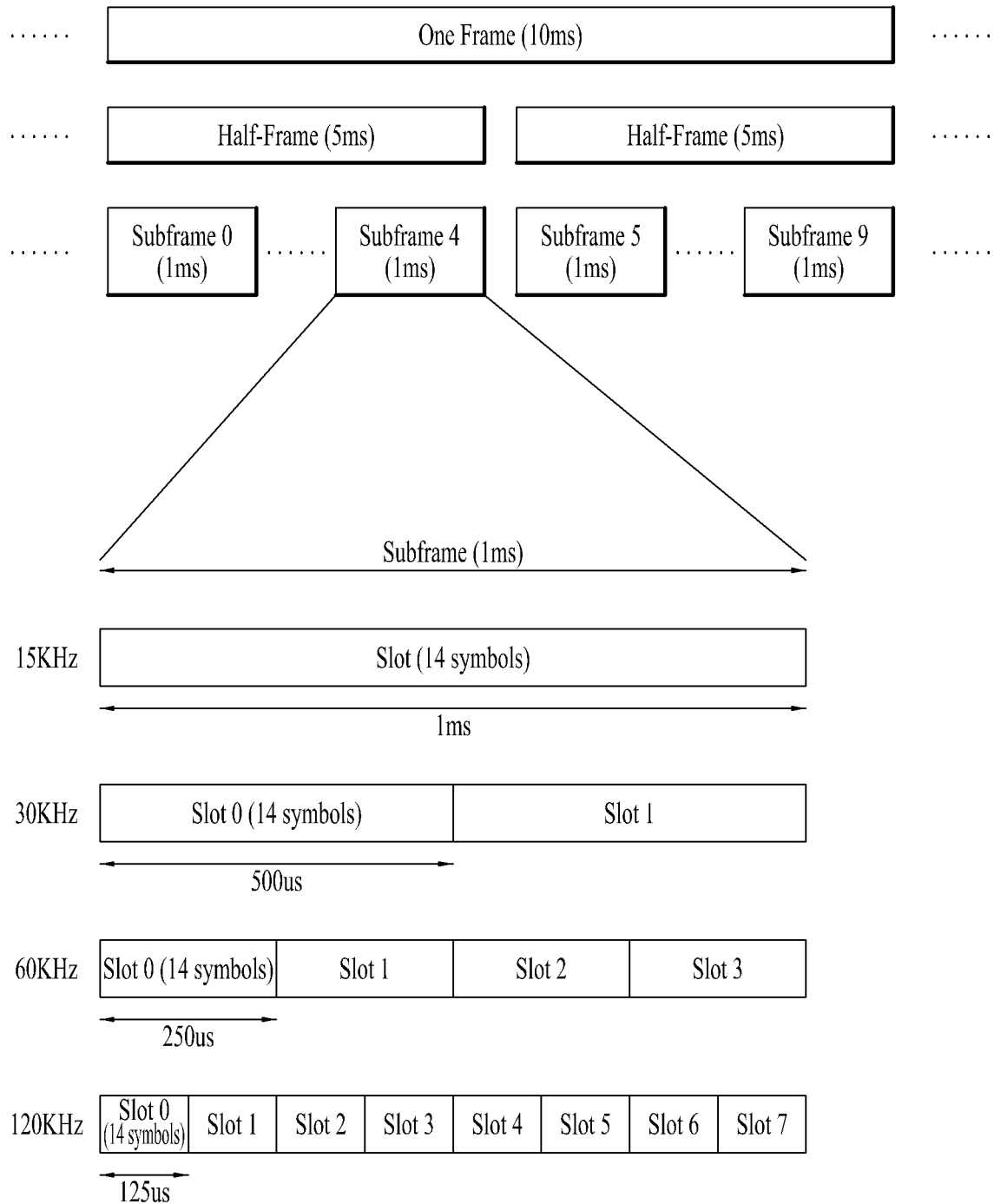
FIGS. 3, 4 and 5 are diagrams illustrating structures of a radio frame and slots used in a new RAT (NR) system.

FIG. 3 illustrates a structure of a radio frame used in NR.

In NR, UL and DL transmissions are configured in frames. The radio frame has a length of 10 ms and is defined as two 5-ms half-frames (HF). The half-frame is defined as five 1 ms subframes (SF). A subframe is divided into one or more slots, and the number of slots in a subframe depends on subcarrier spacing (SCS). Each slot includes 12 or 14 OFDM(A) symbols according to a cyclic prefix (CP). When a normal CP is used, each slot includes 14 symbols. When an extended CP is used, each slot includes 12 symbols. Here, the symbols may include OFDM symbols (or CP-OFDM symbols) and SC-FDMA symbols (or DFT-s-OFDM symbols).

[Table 1] illustrates that the number of symbols per slot, the number of slots per frame, and the number of slots per subframe vary according to the SCS when the normal CP is used

TABLE 1

| SCS (15*2^u) | $N_{slot}^{symb}$ | $N_{frame,\,u}^{slot}$ | $N_{subframe,\,u}^{slot}$ |
|---|---|---|---|
| 15 KHz (u = 0) | 14 | 10 | 1 |
| 30 KHz (u = 1) | 14 | 20 | 2 |

TABLE 1-continued

| SCS (15*2^u) | $N_{slot}^{symb}$ | $N_{frame,\,u}^{slot}$ | $N_{subframe,\,u}^{slot}$ |
|---|---|---|---|
| 60 KHz (u = 2) | 14 | 40 | 4 |
| 120 KHz (u = 3) | 14 | 80 | 8 |
| 240 KHz (u = 4) | 14 | 160 | 16 |

* Nslotsymb: Number of symbols in a slot
* Nframe, uslot: Number of slots in a frame
* Nsubframe, uslot: Number of slots in a subframe

[Table 2] illustrates that the number of symbols per slot, the number of slots per frame, and the number of slots per subframe vary according to the SCS when the extended CP is used.

TABLE 2

| SCS (15*2^u) | $N_{slot}^{symb}$ | $N_{frame,\,u}^{slot}$ | $N_{subframe,\,u}^{slot}$ |
|---|---|---|---|
| 60 KHz (u = 2) | 12 | 40 | 4 |

In the NR system, the OFDM(A) numerology (e.g., SCS, CP length, etc.) may be configured differently among a plurality of cells merged for one UE. Thus, the (absolute time) duration of a time resource (e.g., SF, slot or TTI) (referred to as a time unit (TU) for simplicity) composed of the same number of symbols may be set differently among the merged cells.

Figure 4:
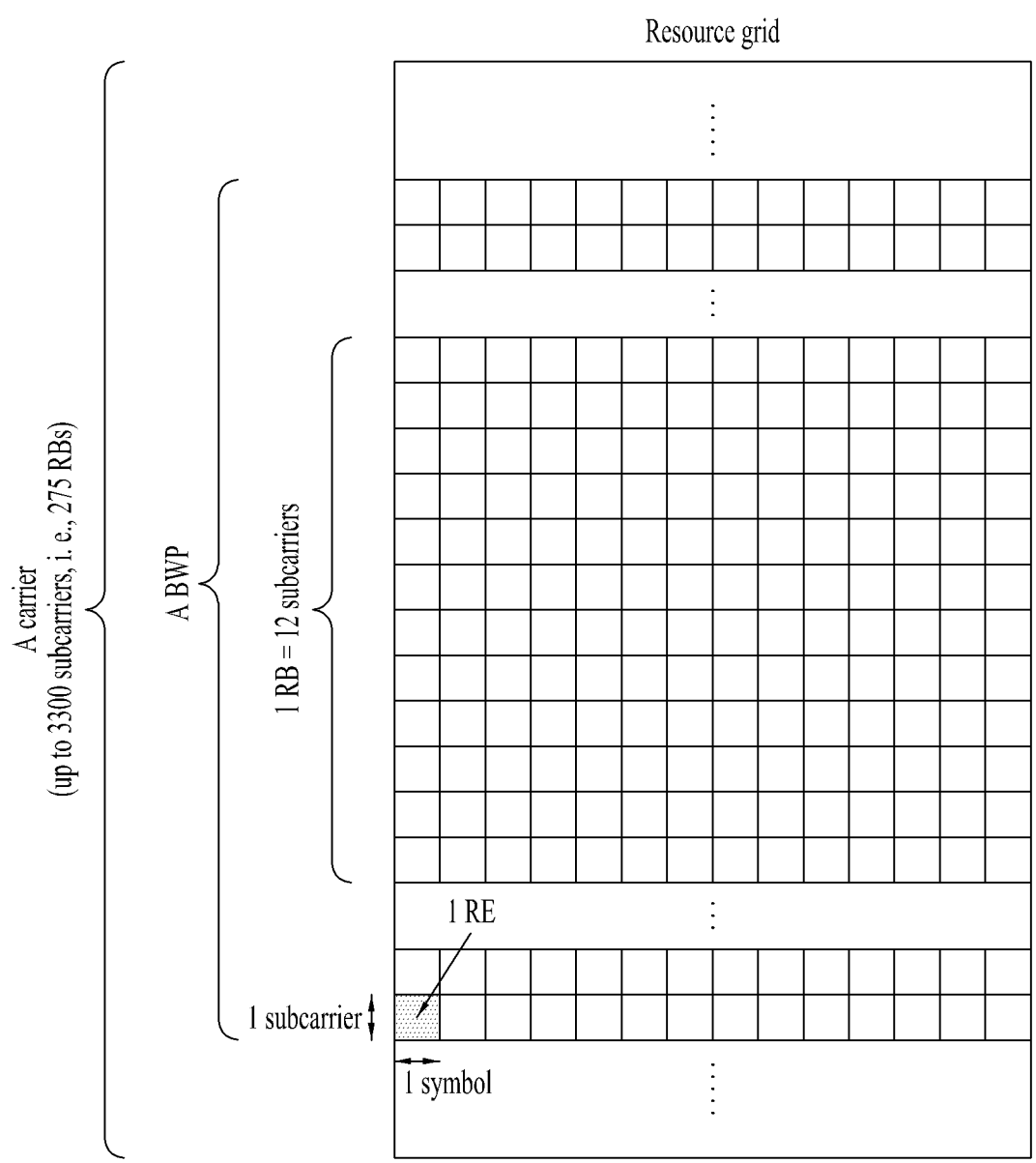

FIG. 4 illustrates a slot structure of an NR frame. A slot includes a plurality of symbols in the time domain. For example, in the case of the normal CP, one slot includes seven symbols. On the other hand, in the case of the extended CP, one slot includes six symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) is defined as a plurality of consecutive (P)RBs in the frequency domain and may correspond to one numerology (e.g., SCS, CP length, etc.). A carrier may include up to N (e.g., 4) BWPs. Data communication is performed through an activated BWP, and only one BWP may be activated for one UE. In the resource grid, each element is referred to as a resource element (RE), and one complex symbol may be mapped thereto.

Figure 5:
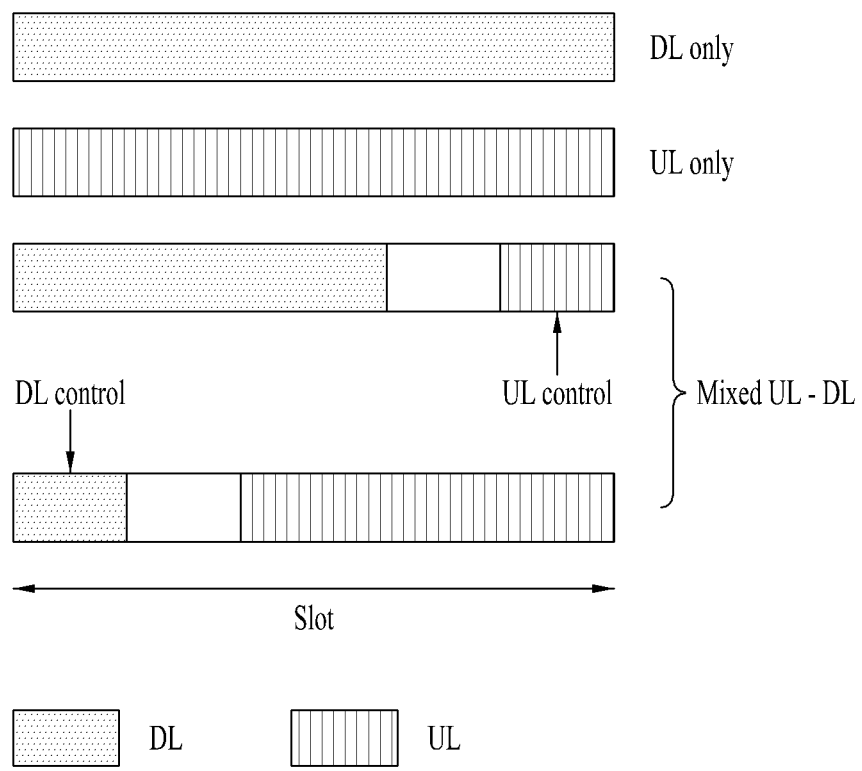

FIG. 5 illustrates a structure of a self-contained slot. In the NR system, a frame has a self-contained structure in which a DL control channel, DL or UL data, a UL control channel, and the like may all be contained in one slot. For example, the first N symbols (hereinafter, DL control region) in the slot may be used to transmit a DL control channel, and the last M symbols (hereinafter, UL control region) in the slot may be used to transmit a UL control channel N and M are integers greater than or equal to 0. A resource region (hereinafter, a data region) that is between the DL control region and the UL control region may be used for DL data transmission or UL data transmission. For example, the following configuration may be considered. Respective sections are listed in a temporal order.

1. DL only configuration
2. UL only configuration
3. Mixed UL-DL configuration
   DL region+Guard period (GP)+UL control region
   DL control region+GP+UL region
   DL region: (i) DL data region, (ii) DL control region+DL data region
   UL region: (i) UL data region, (ii) UL data region+UL control region The PDCCH may be transmitted in the DL control region, and the PDSCH may be transmitted in the DL data region. The PUCCH may be transmitted in the UL control region, and the PUSCH may be transmitted in the UL data region. Downlink control information (DCI), for example, DL data scheduling information, UL data scheduling information, and the like, may be transmitted on the PDCCH. Uplink control information (UCI), for example, ACK/NACK information about DL data, channel state information (CSI), and a scheduling request (SR), may be transmitted on the PUCCH. The GP provides a time gap in the process of the UE switching from the transmission mode to the reception mode or from the reception mode to the transmission mode. Some symbols at the time of switching from DL to UL within a subframe may be configured as the GP.

Positioning Reference Signal (PRS) in LTE System

Positioning may refer to determining the geographical position and/or velocity of the UE based on measurement of radio signals. Location information may be requested by and reported to a client (e.g., an application) associated with the UE. The location information may also be requested by a client within or connected to a core network. The location information may be reported in standard formats such as cell-based or geographical coordinates, together with estimated errors of the position and velocity of the UE and/or a positioning method used for positioning.

For such positioning, a positioning reference signal (PRS) may be used. The PRS is a reference signal used to estimate the position of the UE. For example, in the LTE system, the PRS may be transmitted only in a DL subframe configured for PRS transmission (hereinafter, "positioning subframe"). If both a multimedia broadcast single frequency network (MBSFN) subframe and a non-MBSFN subframe are configured as positioning subframes, OFDM symbols of the MBSFN subframe should have the same cyclic prefix (CP) as symbols of subframe #0. If only the MBSFN subframe is configured as the positioning subframe within a cell, OFDM symbols configured for the PRS in the MBSFN subframe may have an extended CP.

The sequence of the PRS may be defined by [Equation 1] below.

$$r_{l,n_s}(m) = \frac{1}{\sqrt{2}}(1 - 2 \cdot c(2m)) + j\frac{1}{\sqrt{2}}(1 - 2 \cdot c(2m+1)), \quad \text{[Equation 1]}$$

$$m = 0, 1, \ldots, 2N_{RB}^{max,DL} - 1$$

where $n_s$ denotes a slot number in a radio frame and $l$ denotes an OFDM symbol number in a slot. $N_{RB}^{max,DL}$ is represented as an integer multiple of $N_{SC}^{RB}$ as the largest value among DL bandwidth configurations. $N_{SC}^{RB}$ denotes the size of a resource block (RB) in the frequency domain, for example, 12 subcarriers.

$c(i)$ denotes a pseudo-random sequence and may be initialized by [Equation 2] below.

$$c_{init} = 2^{28} \cdot \lfloor N_{ID}^{PRS}/512 \rfloor + \quad \text{[Equation 2]}$$
$$2^{10} \cdot (7 \cdot (n_s + 1) + l + 1) \cdot (2 \cdot (N_{ID}^{PRS} \bmod 512) + 1) +$$
$$2 \cdot (N_{ID}^{PRS} \bmod 512) + N_{CP}$$

Unless additionally configured by higher layers, $N_{ID}^{PRS}$ is equal to $N_{ID}^{cell}$, and NCP is 1 for a normal CP and 0 for an extended CP.

Figure 6:
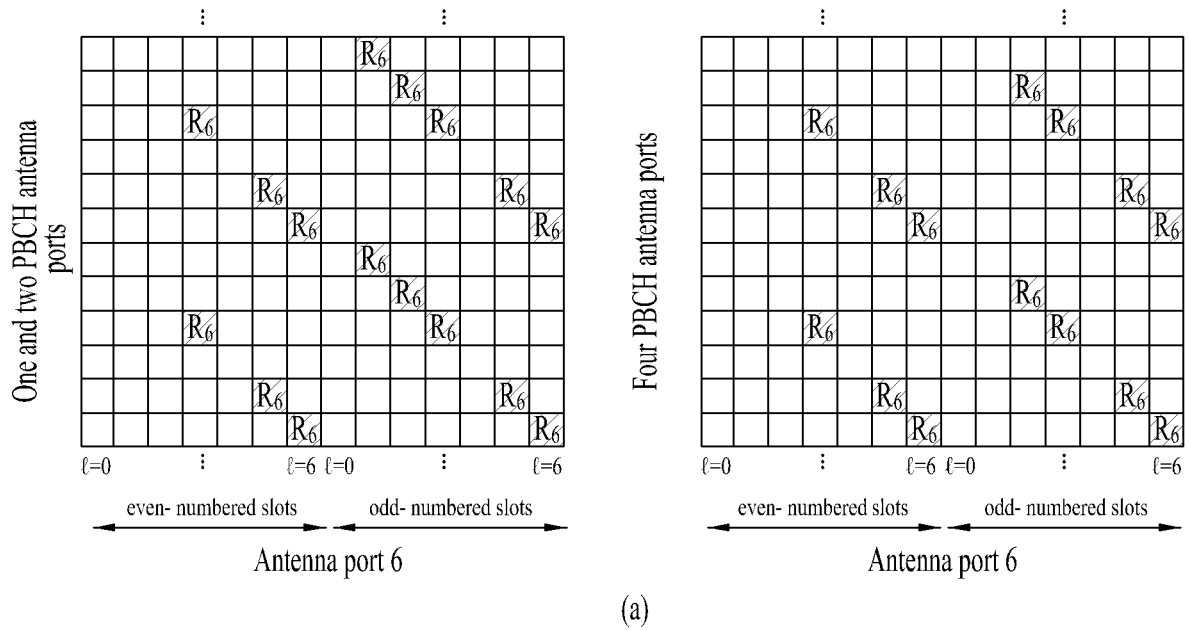
FIG. 6 illustrates an exemplary pattern to which a positioning reference signal (PRS) is mapped in a subframe in LTE system.
Figure 6:
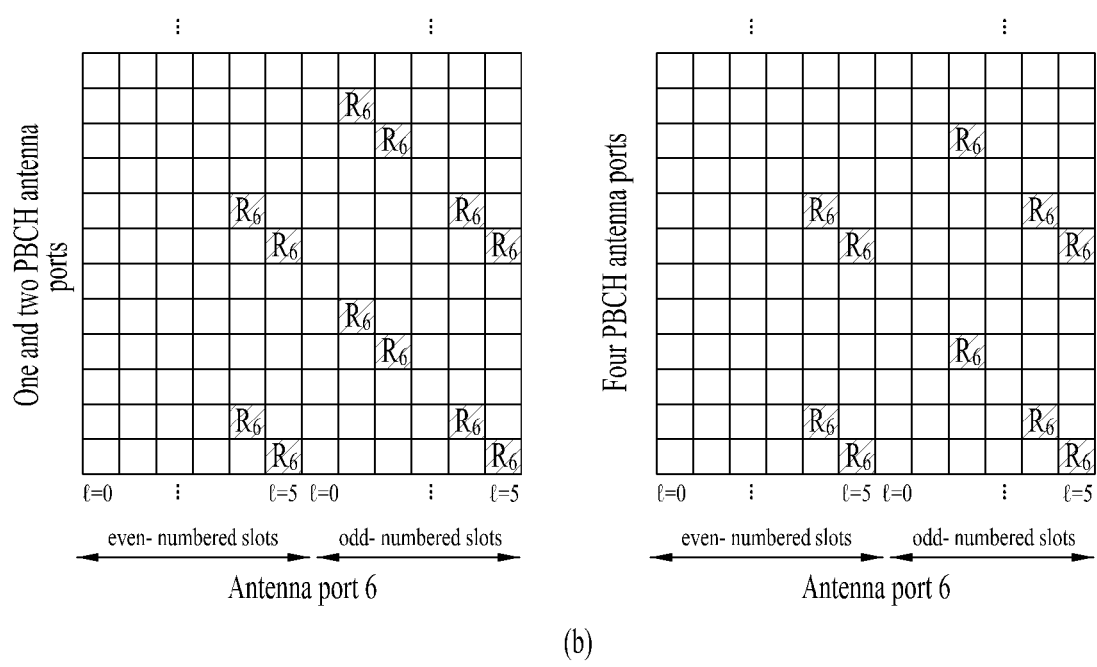

FIG. 6 illustrates an exemplary pattern to which a PRS is mapped in a subframe. As illustrated in FIG. 6, the PRS may be transmitted through an antenna port 6. FIG. 6(a) illustrates mapping of the PRS in the normal CP and FIG. 6(b) illustrates mapping of the PRS in the extended CP.

The PRS may be transmitted in consecutive subframes grouped for positioning. The subframes grouped for positioning are referred to as a positioning occasion. The positioning occasion may consist of 1, 2, 4 or 6 subframes. The positioning occasion may occur periodically at a periodicity of 160, 320, 640 or 1280 subframes. A cell-specific subframe offset value may be defined to indicate the starting subframe of PRS transmission. The offset value and the periodicity of the positioning occasion for PRS transmission may be derived from PRS configuration indexes as listed in [Table 3] below.

TABLE 3

| PRS configuration Index ($I_{PRS}$) | PRS periodicity (subframes) | PRS subframe offset (subframes) |
| --- | --- | --- |
| 0-159 | 160 | $I_{PRS}$ |
| 160-479 | 320 | $I_{PRS}$-160 |
| 480-1119 | 640 | $I_{PRS}$-480 |
| 1120-2399 | 1280 | $I_{PRS}$-1120 |
| 2400-2404 | 5 | $I_{PRS}$-2400 |
| 2405-2414 | 10 | $I_{PRS}$-2405 |
| 2415-2434 | 20 | $I_{PRS}$-2415 |
| 2435-2474 | 40 | $I_{PRS}$-2435 |
| 2475-2554 | 80 | $I_{PRS}$-2475 |
| 2555-4095 | | Reserved |

A PRS included in each positioning occasion is transmitted with constant power. A PRS in a certain positioning occasion may be transmitted with zero power, which is referred to as PRS muting. For example, when a PRS transmitted by a serving cell is muted, the UE may easily detect a PRS of a neighbor cell.

The PRS muting configuration of a cell may be defined by a periodic muting sequence consisting of 2, 4, 8 or 16 positioning occasions. That is, the periodic muting sequence may include 2, 4, 8, or 16 bits according to a positioning occasion corresponding to the PRS muting configuration and each bit may have a value "0" or "1". For example, PRS muting may be performed in a positioning occasion with a bit value of "0".

The positioning subframe is designed to have a low-interference subframe so that no data is transmitted in the positioning subframe. Therefore, the PRS is not subjected to interference due to data transmission although the PRS may interfere with PRSs of other cells.

UE Positioning Architecture in LTE System

Figure 7:
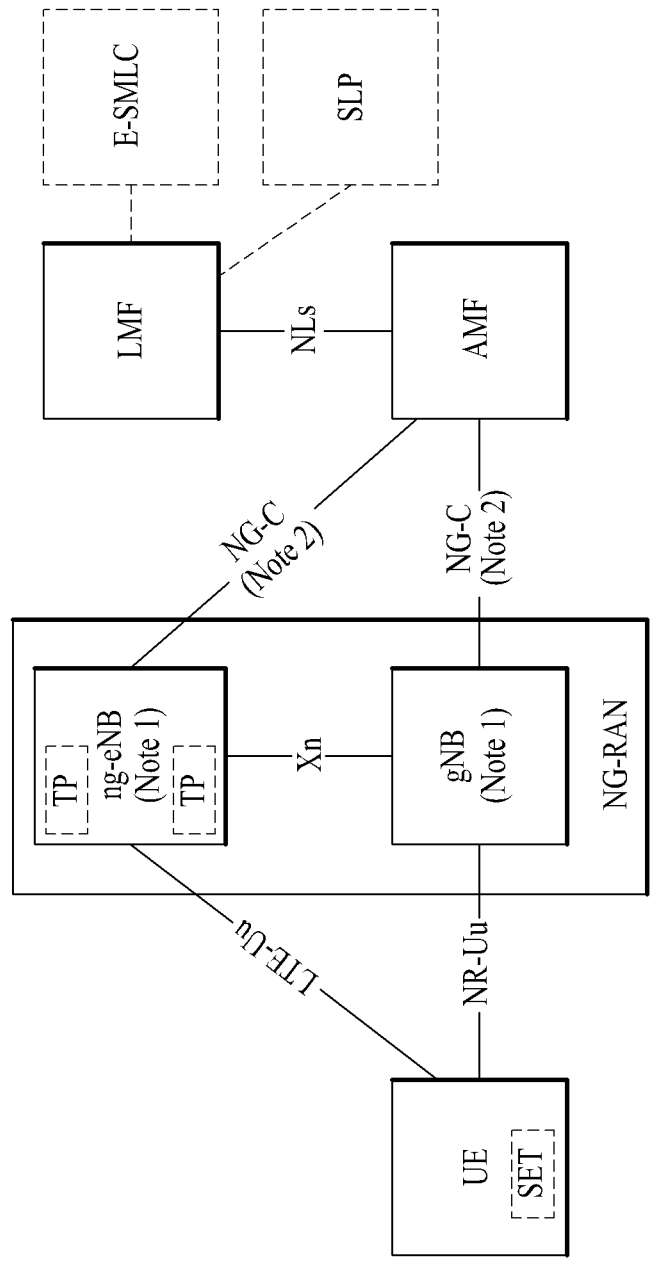
FIGS. 7 and 8 are diagrams illustrating the architecture of a system for measuring the position of a UE and a procedure of measuring the position of the UE.

FIG. 7 illustrates the architecture of a 5G system applicable to positioning of a UE connected to a next generation-radio access network (NG-RAN) or an E-UTRAN.

Referring to FIG. 7, a core access and mobility management function (AMF) may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

A new generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support an observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain positioning for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Operation for UE Positioning

Figure 8:
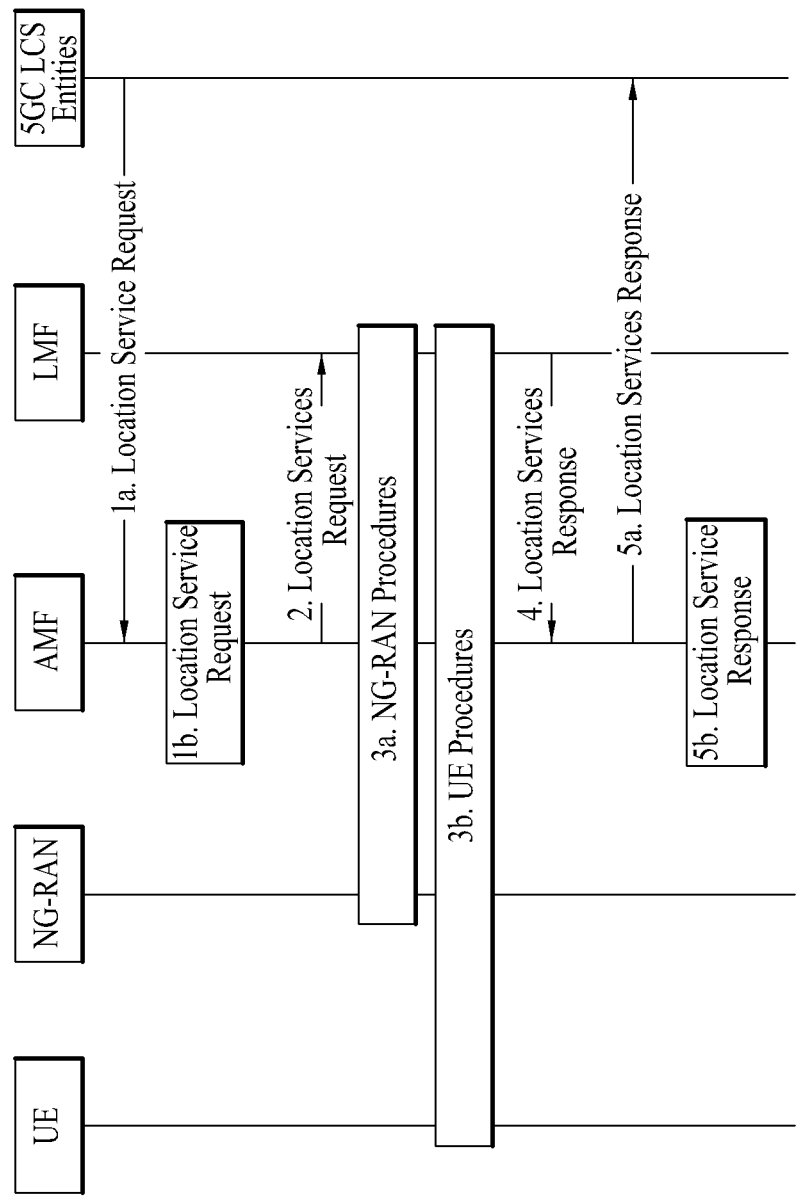

FIG. 8 illustrates an implementation example of a network for UE positioning. When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 8. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. For example, the LMF may transmit a request for location related information associated with one or more UEs to the NG-RAN and indicate the type of necessary location information and associated QoS. Then, the NG-RAN may transfer the location related information to the LMF in response to the request. In this case, when a location determination method according to the request is an enhanced cell ID (E-CID) scheme, the NG-RAN may transfer additional location related information to the LMF in one or more NR positioning protocol A (NRPPa) messages. Here, the "location related information" may mean all values used for location calculation such as actual location estimate information and radio measurement or location measurement. Protocol used in step 3*a* may be an NRPPa protocol which will be described later.

Additionally, in step 3*b*, the LMF may initiate a location procedure for DL positioning together with the UE. For example, the LMF may transmit the location assistance data to the UE or obtain a location estimate or location measurement value. For example, in step 3*b*, a capability information transfer procedure may be performed. Specifically, the LMF may transmit a request for capability information to the UE and the UE may transmit the capability information to the LMF. Here, the capability information may include information about a positioning method supportable by the LFM or the UE, information about various aspects of a particular positioning method, such as various types of assistance data for an A-GNSS, and information about common features not specific to any one positioning method, such as ability to handle multiple LPP transactions. In some cases, the UE may provide the capability information to the LMF although the LMF does not transmit a request for the capability information.

As another example, in step 3*b*, a location assistance data transfer procedure may be performed. Specifically, the UE may transmit a request for the location assistance data to the LMF and indicate particular location assistance data needed to the LMF. Then, the LMF may transfer corresponding location assistance data to the UE and transfer additional assistance data to the UE in one or more additional LTE positioning protocol (LPP) messages. The location assistance data delivered from the LMF to the UE may be transmitted in a unicast manner In some cases, the LMF may transfer the location assistance data and/or the additional assistance data to the UE without receiving a request for the assistance data from the UE.

As another example, in step 3*b*, a location information transfer procedure may be performed. Specifically, the LMF may send a request for the location (related) information associated with the UE to the UE and indicate the type of necessary location information and associated QoS. In response to the request, the UE may transfer the location related information to the LMF. Additionally, the UE may transfer additional location related information to the LMF in one or more LPP messages. Here, the "location related information" may mean all values used for location calculation such as actual location estimate information and radio measurement or location measurement. Typically, the location related information may be a reference signal time difference (RSTD) value measured by the UE based on DL RSs transmitted to the UE by a plurality of NG-RANs and/or E-UTRANs. Similarly to the above description, the UE may transfer the location related information to the LMF without receiving a request from the LMF.

The procedures implemented in step 3b may be performed independently but may be performed consecutively. Generally, although step 3b is performed in order of the capability information transfer procedure, the location assistance data transfer procedure, and the location information transfer procedure, step 3b is not limited to such order. In other words, step 3b is not required to occur in specific order in order to improve flexibility in positioning. For example, the UE may request the location assistance data at any time in order to perform a previous request for location measurement made by the LMF. The LMF may also request location information, such as a location measurement value or a location estimate value, at any time, in the case in which location information transmitted by the UE does not satisfy required QoS. Similarly, when the UE does not perform measurement for location estimation, the UE may transmit the capability information to the LMF at any time.

In step 3b, when information or requests exchanged between the LMF and the UE are erroneous, an error message may be transmitted and received and an abort message for aborting positioning may be transmitted and received.

Protocol used in step 3b may be an LPP protocol which will be described later.

Step 3b may be performed additionally after step 3a but may be performed instead of step 3a.

In step 4, the LMF may provide a location service response to the AMF. The location service response may include information as to whether UE positioning is successful and include a location estimate value of the UE. If the procedure of FIG. 8 has been initiated by step 1a, the AMF may transfer the location service response to a 5GC entity such as a GMLC. If the procedure of FIG. 8 has been initiated by step 1b, the AMF may use the location service response in order to provide a location service related to an emergency call.

Protocol for Location Measurement (1) LTE Positioning Protocol (LPP)

Figure 9:
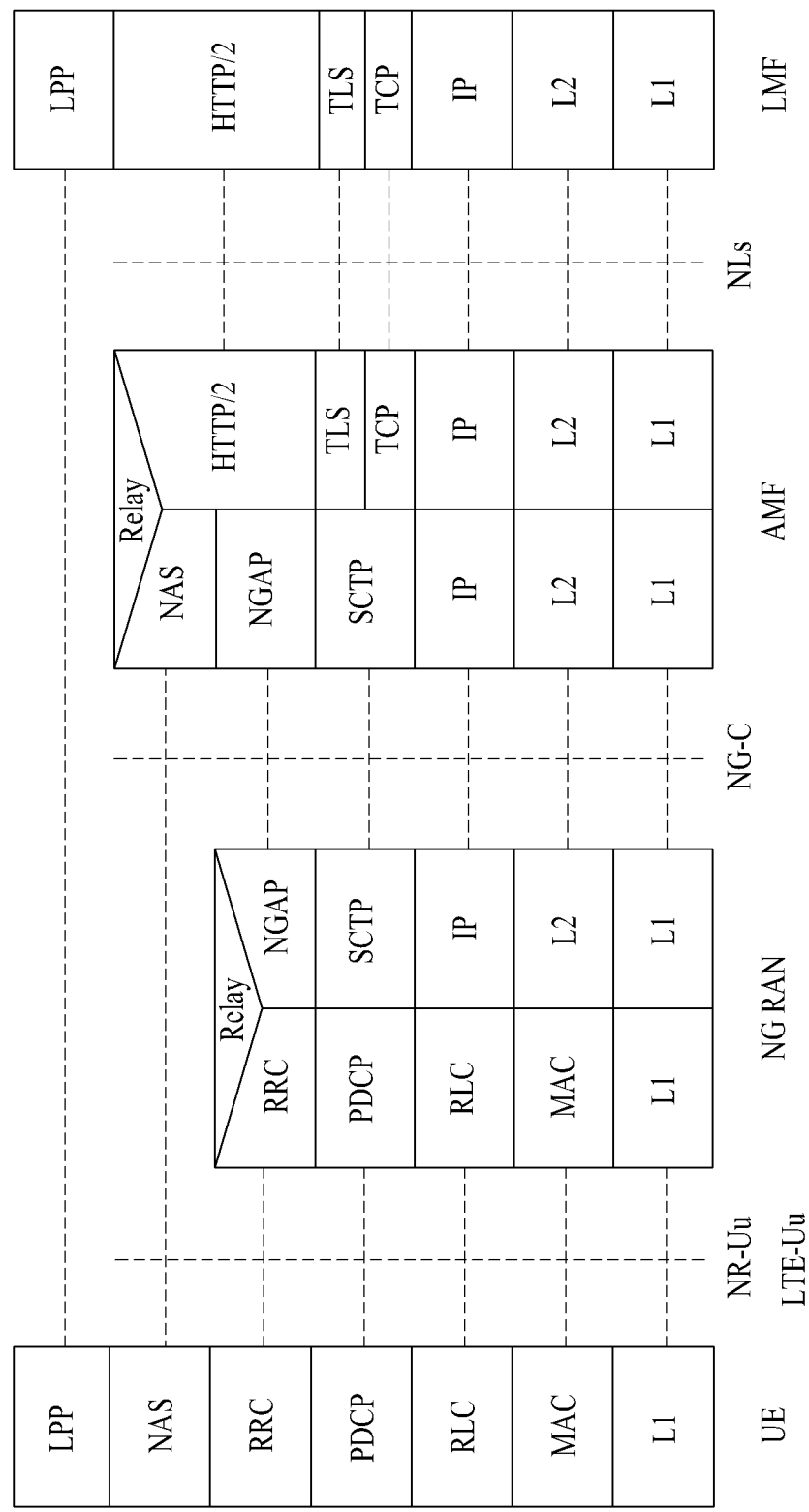
FIG. 9 illustrates an exemplary protocol layer used to support LTE positioning protocol (LPP) message transfer.

FIG. 9 illustrates an exemplary protocol layer used to support LPP message transfer between an LMF and a UE. An LPP protocol data unit (PDU) may be carried in a NAS PDU between an MAF and the UE. Referring to FIG. 9, LPP is terminated between a target device (e.g., a UE in a control plane or an SUPL enabled terminal (SET) in a user plane) and a location server (e.g., an LMF in the control plane or an SLP in the user plane). LPP messages may be carried as transparent PDUs cross intermediate network interfaces using appropriate protocols, such an NGAP over an NG-C interface and NAS/RRC over LTE-Uu and NR-Uu interfaces. LPP is intended to enable positioning for NR and LTE using various positioning methods.

For example, a target device and a location server may exchange, through LPP, capability information therebetween, assistance data for positioning, and/or location information. The target device and the location server may exchange error information and/or indicate stopping of an LPP procedure, through an LPP message.

(2) NR Positioning Protocol A (NRPPa)

Figure 10:
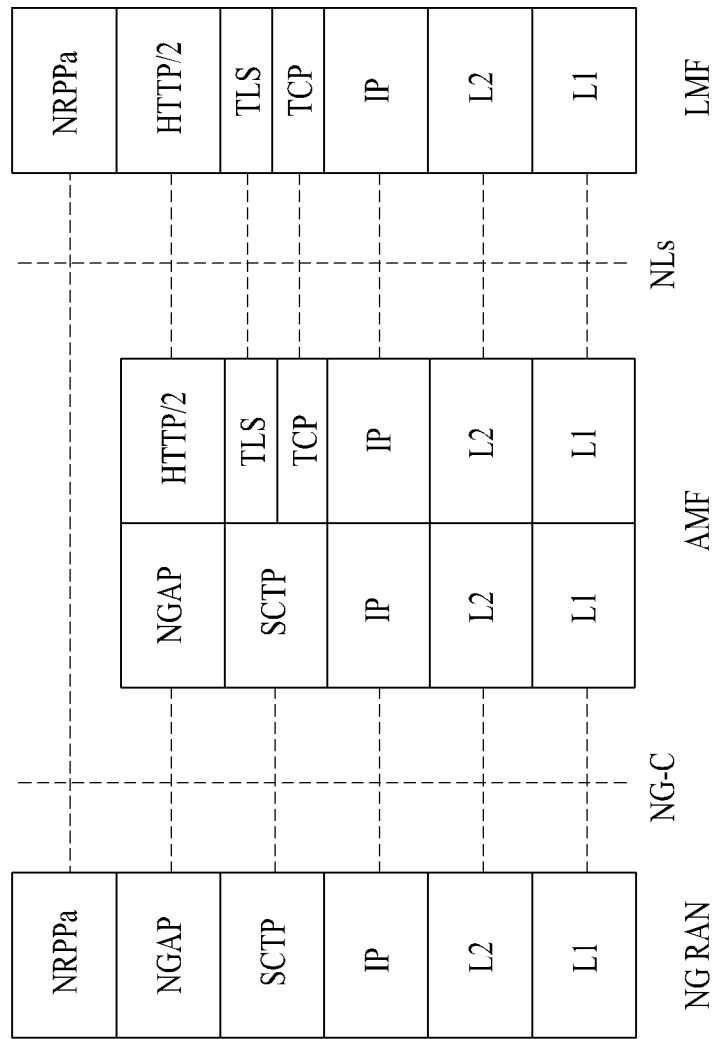
FIG. 10 is a diagram illustrating an exemplary protocol layer used to support NR positioning protocol A (NRPPa) protocol data unit (PDU) transfer.

FIG. 10 illustrates an exemplary protocol layer used to support NRPPa PDU transfer between an LMF and an NG-RAN node. NRPPa may be used to carry information between an NG-RAN node and an LMF. Specifically, NRPPa may exchange an E-CID for measurement transferred from an ng-eNB to an LMF, data for support of an OTDOA positioning method, and a cell-ID and a cell position ID for an NR cell ID positioning method. An AMF may route NRPPa PDUs based on a routing ID of an involved LMF over an NG-C interface without information about related NRPPa transaction.

An NRPPa procedure for location and data collection may be divided into two types. The first type is a UE associated procedure for transmitting information about a particular UE (e.g., location measurement information) and the second type is a non-UE-associated procedure for transmitting information applicable to an NG-RAN node and associated TPs (e.g., timing information of the gNB/ng-eNG/TP). The two types may be supported independently or simultaneously.

Positioning Measurement Method

Positioning methods supported in the NG-RAN may include a GNSS, an OTDOA, an E-CID, barometric sensor positioning, WLAN positioning, Bluetooth positioning, a TBS, uplink time difference of arrival (UTDOA) etc. Although any one of the positioning methods may be used for UE positioning, two or more positioning methods may be used for UE positioning.

(1) Observed Time Difference of Arrival (OTDOA)

Figure 11:
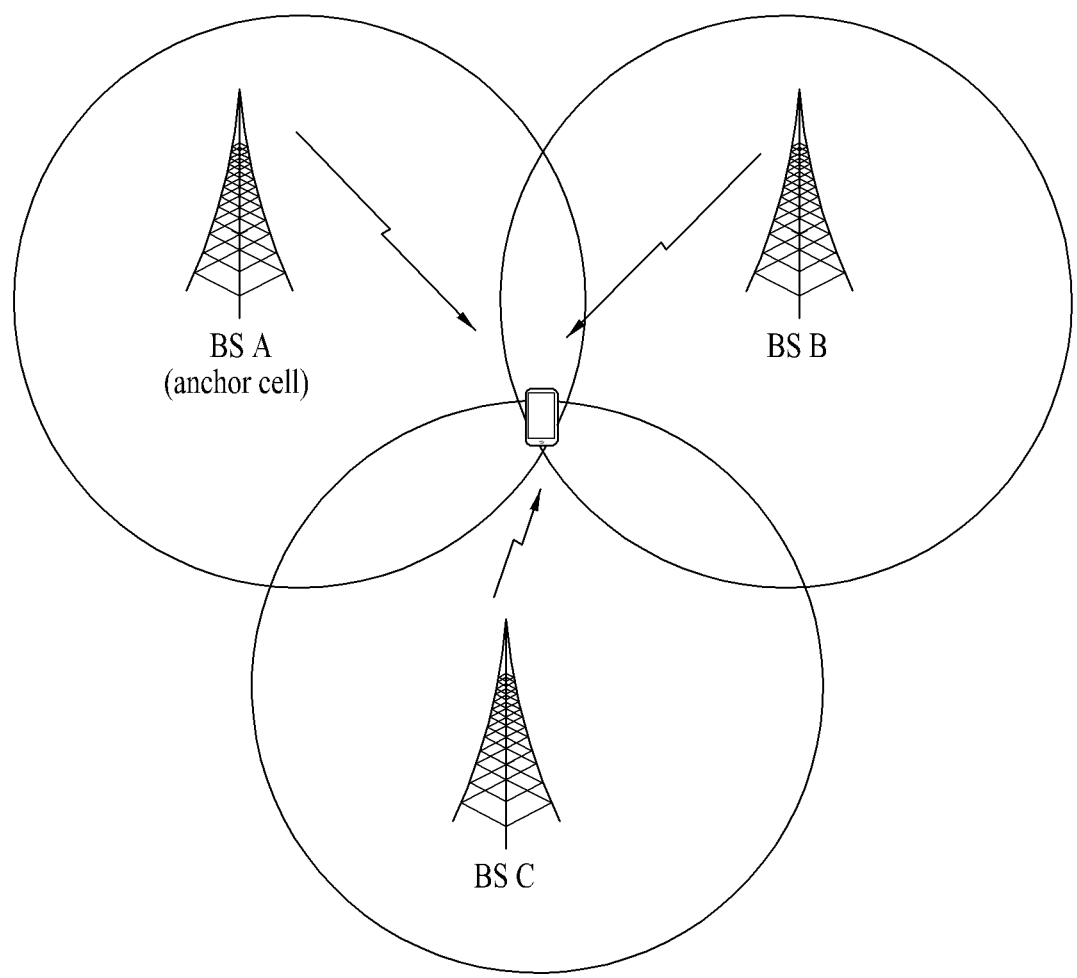
FIG. 11 is a diagram illustrating an embodiment of an observed time difference of arrival (OTDOA) positioning method.

FIG. 11 is a diagram illustrating an OTDOA positioning method. The OTDOA positioning method uses time measured for DL signals received from multiple TPs including an eNB, an ng-eNB, and a PRS-only TP by the UE. The UE measures time of received DL signals using location assistance data received from a location server. The position of the UE may be determined based on such a measurement result and geographical coordinates of neighboring TPs.

The UE connected to the gNB may request measurement gaps to perform OTDOA measurement from a TP. If the UE is not aware of an SFN of at least one TP in OTDOA assistance data, the UE may use autonomous gaps to obtain an SFN of an OTDOA reference cell prior to requesting measurement gaps for performing reference signal time difference (RSTD) measurement.

Here, the RSTD may be defined as the smallest relative time difference between two subframe boundaries received from a reference cell and a measurement cell. That is, the RSTD may be calculated as the relative time difference between the start time of a subframe received from the measurement cell and the start time of a subframe from the reference cell that is closest to the subframe received from the measurement cell. The reference cell may be selected by the UE.

For accurate OTDOA measurement, it is necessary to measure times of arrival (ToAs) of signals received from geographically distributed three or more TPs or BSs. For example, ToAs for TP 1, TP 2, and TP 3 may be measured, and an RSTD for TP 1 and TP 2, an RSTD for TP 2 and TP 3, and an RSTD for TP 3 and TP 1 are calculated based on the three ToAs. A geometric hyperbola may be determined based on the calculated RSTD values and a point at which curves of the hyperbola cross may be estimated as the position of the UE. In this case, accuracy and/or uncertainty for each ToA measurement may occur and the estimated position of the UE may be known as a specific range according to measurement uncertainty.

For example, an RSTD for two TPs may be calculated based on [Equation 3] below.

$$RSTD_{i,1} = \frac{\sqrt{(x_t - x_i)^2 + (y_t - y_i)^2}}{c} - \frac{\sqrt{(x_t - x_1)^2 + (y_t - y_1)^2}}{c} + (T_i - T_1) + (n_i - n_1) \qquad \text{[Equation 3]}$$

where c is the speed of light, {xt, yt} are (unknown) coordinates of a target UE, {xi, yi} are (known) coordinates of a TP, and {xl, yl} are coordinates of a reference TP (or another TP). Here, (Ti−T1) is a transmission time offset between two TPs, referred to as "real time differences" (RTDs), and ni and n1 are UE ToA measurement error values.

(2) Enhanced Cell ID (E-CID)

In a cell ID (CID) positioning method, the position of the UE may be measured based on geographical information of a serving ng-eNB, a serving gNB, and/or a serving cell of the UE. For example, the geographical information of the serving ng-eNB, the serving gNB, and/or the serving cell may be acquired by paging, registration, etc.

The E-CID positioning method may use additional UE measurement and/or NG-RAN radio resources in order to improve UE location estimation in addition to the CID positioning method. Although the E-CID positioning method partially may utilize the same measurement methods as a measurement control system on an RRC protocol, additional measurement only for UE location measurement is not generally performed. In other words, an additional measurement configuration or measurement control message may not be provided for UE location measurement. The UE does not expect that an additional measurement operation only for location measurement will be requested and the UE may report a measurement value obtained by generally measurable methods.

For example, the serving gNB may implement the E-CID positioning method using an E-UTRA measurement value provided by the UE.

Measurement elements usable for E-CID positioning may be, for example, as follows.

UE measurement: E-UTRA reference signal received power (RSRP), E-UTRA reference signal received quality (RSRQ), UE E-UTRA reception (RX)-transmission (TX) time difference, GERAN/WLAN reference signal strength indication (RSSI), UTRAN common pilot channel (CPICH) received signal code power (RSCP), and/or UTRAN CPICH Ec/Io E-UTRAN measurement: ng-eNB RX-TX time difference, timing advance (TADV), and/or angle of arrival (AoA)

Here, TADV may be divided into Type 1 and Type 2 as follows.

TADV Type 1 = (ng − eNB RX − TX time difference) +

(UE E − UTRA RX − TX time difference)

TADV Type 2 = ng − eNB RX − TX time difference

AoA may be used to measure the direction of the UE. AoA is defined as the estimated angle of the UE counterclockwise from the eNB/TP. In this case, a geographical reference direction may be north. The eNB/TP may use a UL signal such as an SRS and/or a DMRS for AoA measurement. The accuracy of measurement of AoA increases as the arrangement of an antenna array increases. When antenna arrays are arranged at the same interval, signals received at adjacent antenna elements may have constant phase rotate.

(3) Uplink Time Difference of Arrival (UTDOA)

UTDOA is to determine the position of the UE by estimating the arrival time of an SRS. When an estimated SRS arrival time is calculated, a serving cell is used as a reference cell and the position of the UE may be estimated by the arrival time difference with another cell (or an eNB/TP). To implement UTDOA, an E-SMLC may indicate the serving cell of a target UE in order to indicate SRS transmission to the target UE. The E-SMLC may provide configurations such as periodic/non-periodic SRS, bandwidth, and frequency/group/sequence hopping.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

UL BM Process

In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM process to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM process may also be divided into Tx beam sweeping at the UE and Rx beam sweeping at the BS similarly to DL BM.

Figure 12:
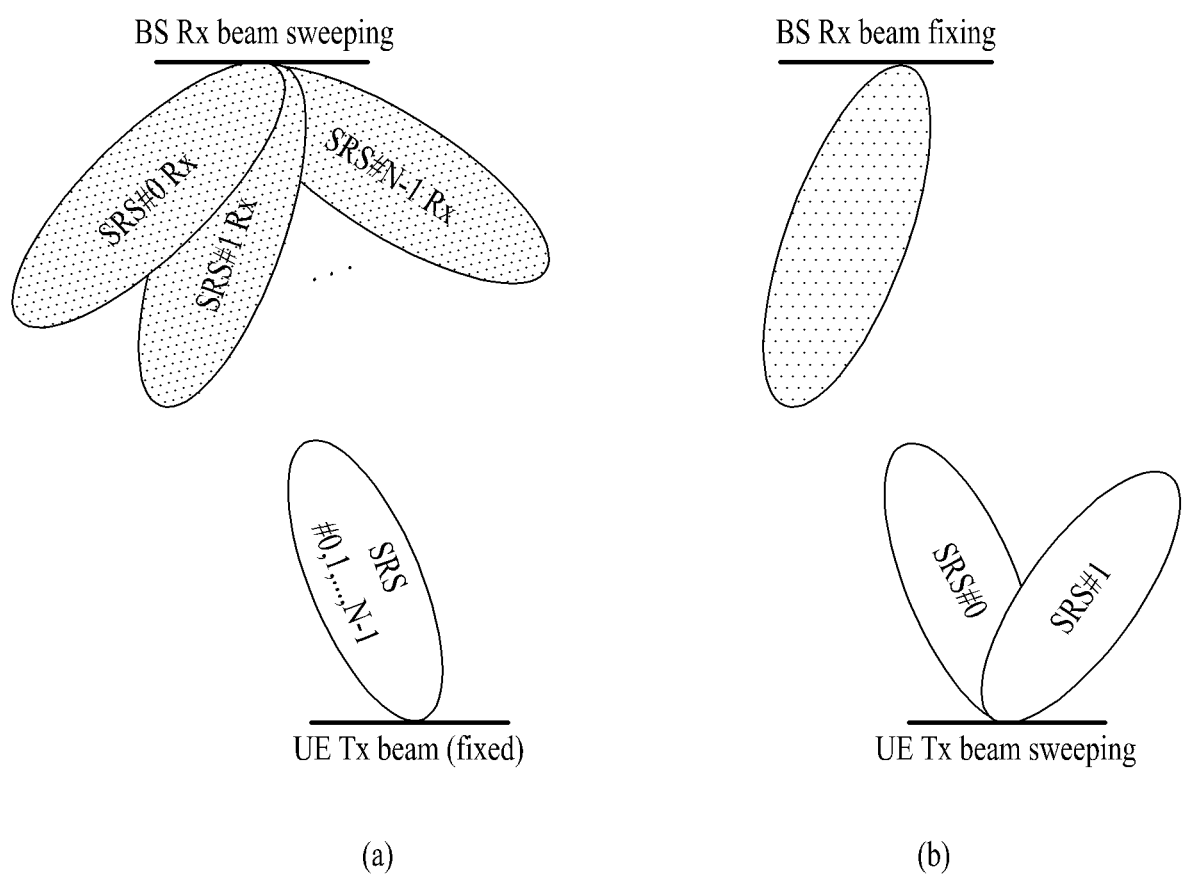
FIGS. 12 and 13 are diagrams illustrating uplink beam management based on a sounding reference signal (SRS).

FIG. 12 illustrates an example of a UL BM process based on an SRS.

FIG. 12(*a*) shows a process in which the BS determines Rx beamforming, and FIG. 12(*b*) shows a process in which the UE performs Tx beam sweeping.

Figure 13:
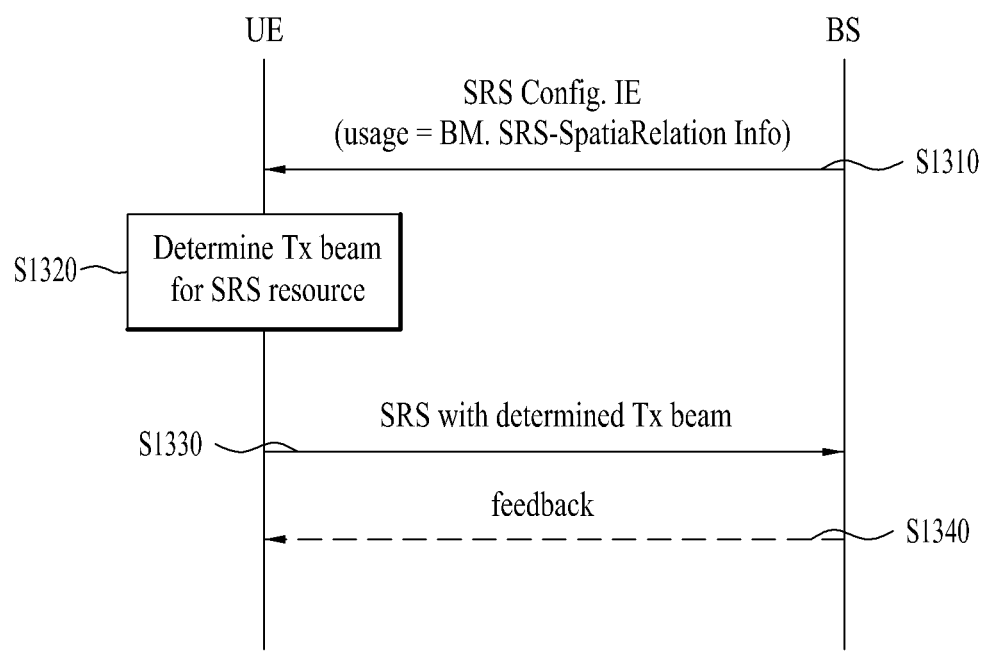

FIG. 13 is a flowchart illustrating an example of a UL BM process based on an SRS.

The UE receives RRC signaling (e.g., SRS-Config IE) including a usage parameter (RRC parameter) set to BM from the BS (S1310). The SRS-Config IE is used to configure SRS transmission. The SRS-Config IE includes a list of SRS resources and a list of SRS resource sets. Each SRS resource set refers to a set of SRS resources.

The UE determines Tx beamforming for SRS resources to be transmitted based on SRS-SpatialRelation Info included in the SRS-Config IE (S1320). Here, the SRS-SpatialRelation Info is configured for each SRS resource and indicates whether the same beamforming as that used for an SSB, a CSI-RS, or an SRS is applied for each SRS resource.

If SRS-SpatialRelationInfo is configured for the SRS resources, the same beamforming as that used in the SSB, CSI-RS, or SRS is applied and transmitted. However, if SRS-SpatialRelationInfo is not configured for the SRS resources, the UE randomly determines the Tx beamforming and transmits an SRS based on the determined Tx beamforming (S1330).

For a P-SRS in which 'SRS-ResourceConfigType' is set to 'periodic':

i) If SRS-SpatialRelationInfo is set to 'SSB/PBCH', the UE transmits the corresponding SRS by applying the same spatial domain transmission filter as a spatial domain reception filter used for receiving the SSB/PBCH (or a spatial domain transmission filter generated from the spatial domain reception filter);

ii) If SRS-SpatialRelationInfo is set to 'CSI-RS', the UE transmits the SRS by applying the same spatial domain transmission filter as that used for receiving the CSI-RS; or iii) If SRS-SpatialRelationInfo is set to 'SRS', the UE transmits the corresponding SRS by applying the same spatial domain transmission filter as that used for transmitting the SRS.

Additionally, the UE may or may not receive feedback on the SRS from the BS as in the following three cases (S1340).

i) When Spatial_Relation_Info is configured for all SRS resources in an SRS resource set, the UE transmits the SRS on a beam indicated by the BS. For example, if Spatial_Relation_Info indicates the same SSB, CRI, or SRI, the UE repeatedly transmits the SRS on the same beam.

ii) Spatial_Relation_Info may not be configured for all SRS resources in the SRS resource set. In this case, the UE may transmit while changing the SRS beamforming randomly.

iii) Spatial_Relation_Info may be configured only for some SRS resources in the SRS resource set. In this case, the UE may transmit the SRS on an indicated beam for the configured SRS resources, but for SRS resources in which Spatial_Relation_Info is not configured, the UE may perform transmission by applying random Tx beamforming.

Sounding Reference Signal (SRS) Power Control

The UE may distribute the same power to antenna ports configured for SRS transmission. If the UE transmits an SRS on active UL BWP b of carrier f of serving cell c using SRS power control adjustment state index 1, SRS transmission power in SRS transmission occasion i may be determined as shown in Equation 4.

$$P_{SRS,b,f,l}(i, q, l) = \min \begin{cases} P_{CMAX,f,c}(i), \\ P_{O\_SRS,b,f,c}(q_i) + 10\log_{10}(2^\mu \cdot M_{SRS,b,f,c}(i)) + \alpha_{SRS,b,f,c}(q_s) \cdot PL_{b,f,c}(q_d) + h_{b,f,c}(i, l) \end{cases} [dBm]$$

In Equation 4, PCMAX,f,c(i) denotes the maximum power output by the UE for carrier f of serving cell c in SRS transmission occasion i, and PO_SRS,b,f,c (qs) may be obtained based on SRS resource set qs and p0 for active UL BWP b.

In addition, MSRS,b,f,c(i) is an SRS bandwidth expressed in the number of RBs for SRS transmission occasion i on active UL BWP b, and $\alpha_{SRS,b,f,c}(q_s)$ may be obtained from alpha for UL BWP b of carrier f of serving cell c and SRS resource set qs. PLb,f,c(qd) is a DL pathloss estimate in dB and may be calculated based on RS index qd for an active DL BWP of the serving cell and SRS resource set qs. The RS index qd is provided by the higher layer parameter pathlossReferenceRS associated with SRS resource set qs. The UE may obtain an SS/PBCH block index or a CSI-RS resource index from pathlossReferenceRS. If the UE does not receive pathlossReferenceRSs, the UE may obtain PLb, f,c(qd) by using as a RS resource the SS/PBCH block index obtained from a master information block (MIB).

Additionally, hb,f,c(i) may be defined by $$h_{b,f,c}(i) = h_{b,f,c}(i - i_0) + \sum_{m=0}^{c(s_i)-1} \delta_{SRS,b,f,c}(m),$$

where the value of $\delta_{SRSb,f,c}$ may be determined according to a predetermined table. In addition, $\delta_{SRS,b,f,c}(m)$ may be jointly coded with other transmit power control (TPC) commands included in DCI format 2_3, and $$\sum_{m=0}^{c(s_i)-1} \delta_{SRS,b,f,c}(m)$$

may be determined based on the sum of TPC command values included in a specific TPC command set.

In cellular communication systems, various methods for detecting and tracking the positions of respective UEs by the BS or UE can be discussed. Generally, there may be a method for acquiring information about the distance between each of BSs having already known position information and each of UEs having already known position information, and acquiring the UE position using the distance information. In order to obtain information about the distance between each BS and each UE, a Round Trip Time (RTT) indicating the distance between the UE and each BS may be directly used, or a Time Difference of Arrival (TDOA) indicating information about a difference in distance between the UE and each BS may be used as necessary.

To this end, the LTE system may define a Positioning Reference Signal (PRS) for allowing the UE to obtain a reception (Rx) time of signals from the BS at a high reliability can be defined. For example, the UE may measure and report an Observed Time Difference Of Arrival (OTDOA) using the PRS.

In order for the BS to perform operation similar to the OTDOA, the LTE system may define measurement of Uplink Time Difference Of Arrival (UTDOA). To this end, a Sounding Reference Signal (SRS) can be utilized to measure the UTDOA. SRS may configure a broadband transmission (Tx) frequency. Therefore, when using SRS characteristics, each BS can measure a Time of Arrival (TOA) having high accuracy.

On the other hand, for UL positioning in the LTE system or the NR system, the UE transmits UL signals to the serving cell and a plurality of TPs/BSs, so that the operation for applying UL power control of the UL signal to be transmitted to another TP/BS on the basis of the serving cell may be considered undesirable. If the UE controls the UL signal to be transmitted to the neighbor TP/BS on the basis of the serving cell, a relatively strong signal may be received by the TP/B S adjacent to the UE, and a relatively weak signal may be received by the TP/BS located far from the UE. This may be problematic for both of two TPs or two BSs. In the case of using the TP/BS having received a strong signal, the corresponding signal may cause strong interference to a signal transmitted by another UE coexisting in coverage of the corresponding TP/BS. In the case of using the TP/BS having received a weak signal, it may be difficult for the TP/BS to normally receive the corresponding signal.

In other words, the UE may transmit the PRS to the plurality of TPs/BSs so as to perform UL positioning. However, when the UE performs power control on the basis of the serving cell, power of signals transmitted to the plurality of TPs/BSs may not be property controlled. Therefore, a method for increasing hearability of the plurality of TPs/BSs for UL positioning will hereinafter be described.

Figure 14:
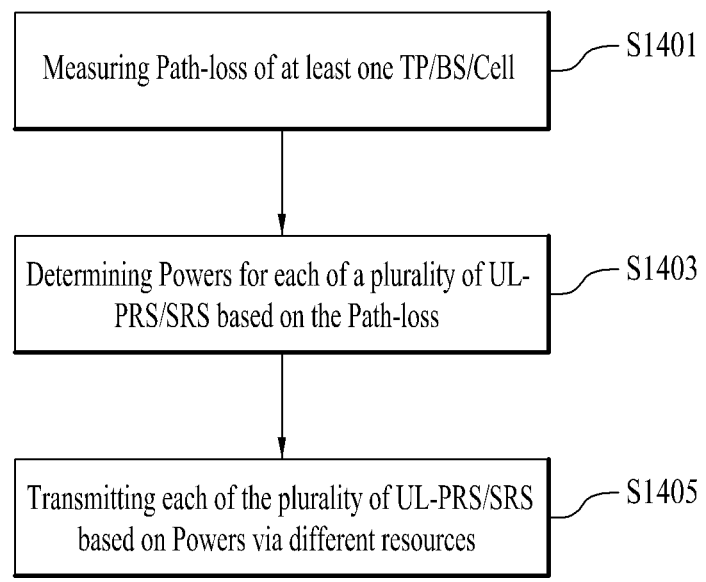
FIG. 14 is a flowchart illustrating operations of a user equipment (UE) according to the present disclosure.
Figure 15:
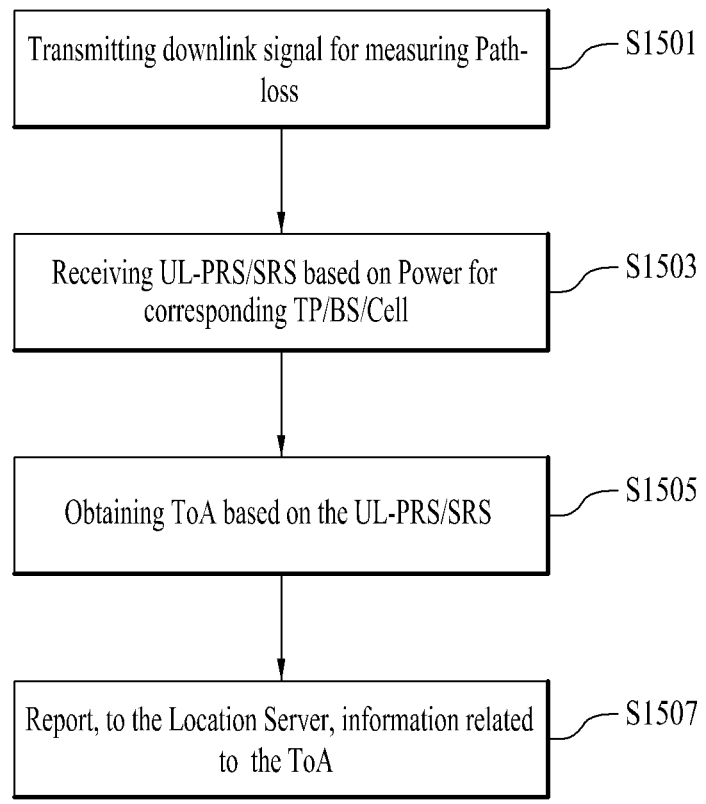
FIG. 15 is a flowchart illustrating operations of a base station (BS) according to the present disclosure.
Figure 16:
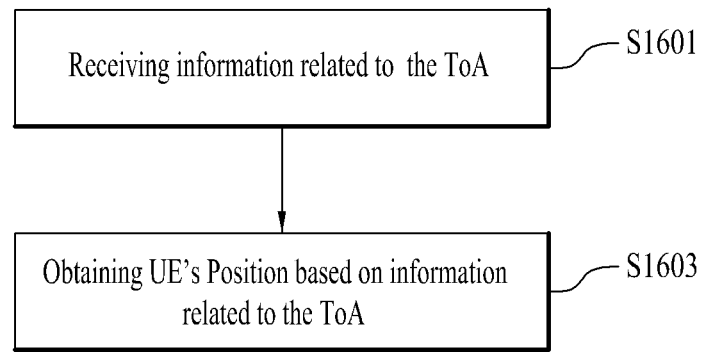
FIG. 16 is a flowchart illustrating operations of a location server according to the present disclosure.
Figure 17:
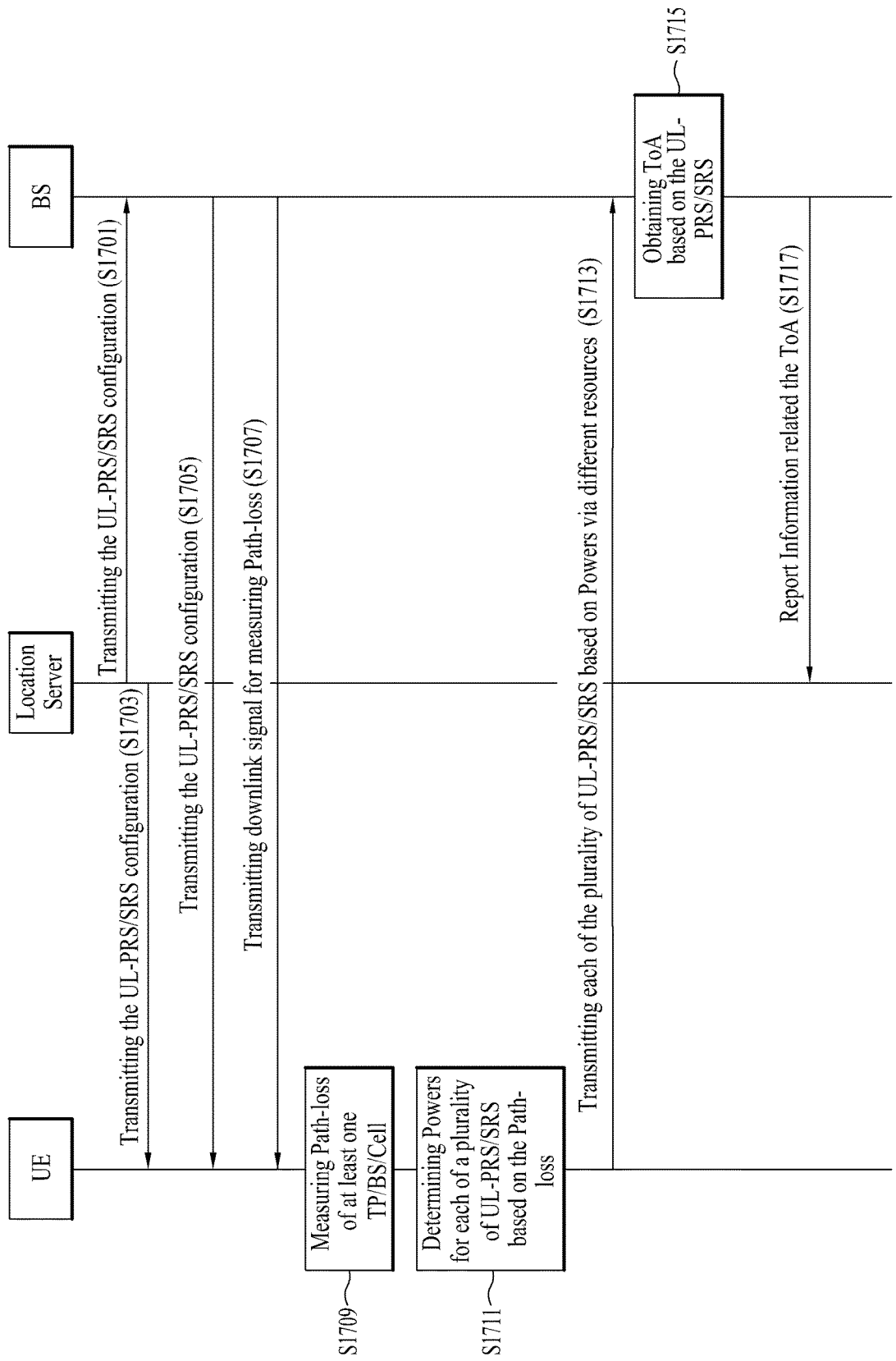
FIG. 17 is a flowchart illustrating operations of a network according to the present disclosure.

FIG. 14 is a flowchart illustrating operations of a user equipment (UE) according to the present disclosure. FIG. 15 is a flowchart illustrating operations of a base station (BS) according to the present disclosure. FIG. 16 is a flowchart illustrating operations of a location server according to the present disclosure. FIG. 17 is a flowchart illustrating operations of a network according to the present disclosure.

FIG. 14 is a flowchart illustrating UE operations according to the present disclosure. Referring to FIG. 14, the UE may measure a pathloss value based on a downlink (DL) signal received from at least one TP/BS/cell (S1401). The UE may decide power of each of the plurality of UL-PRSs/SRSs to be transmitted to the plurality of TPs/BSs/cells on the basis of the pathloss value (S1403), and may transmit each of the plurality of UL-PRSs/SRSs to the plurality of TPs/BSs/cells through different resources on the basis of the decided power (S1405). A detailed operation method of the UE operations can be based on the following embodiments.

Meanwhile, the UE shown in FIG. 14 may be any one of various wireless devices shown in FIGS. 19 to 22. In other words, the UE operations shown in FIG. 14 may be performed or executed by any one of various wireless devices shown in FIGS. 19 to 22. For example, the UE shown in FIG. 14 may refer to either the first wireless device 100 shown in FIG. 19 or the wireless devices 100 and 200 shown in FIG. 20.

FIG. 15 is a flowchart illustrating BS operations according to the present disclosure. Referring to FIG. 15, the BS may transmit a downlink (DL) signal for pathloss measurement (S1501). In addition, the BS may receive the UL-PRS/SRS based on the corresponding BS power determined based on the measured pathloss value (S1503). The BS may acquire Time of Arrival (ToA) based on the UL-PRS/SRS (S1505), and may report ToA information to the location server (S1507).

A detailed operation method of the BS operation can be based on the following embodiments.

On the other hand, the BS shown in FIG. 15 may be any one of various wireless devices shown in FIGS. 19 to 22. In other words, the BS operations shown in FIG. 15 may be performed or executed by any one of various wireless devices shown in FIGS. 19 to 22. For example, the BS shown in FIG. 15 may refer to either the second wireless device 200 shown in FIG. 19 or the wireless devices 100 and 200 shown in FIG. 20.

FIG. 16 is a flowchart illustrating operations of the location server according to the present disclosure. Referring to FIG. 16, the location server may receive ToA-related information from the BS (S1601), and may acquire the UE position based on the ToA-related information (S1603).

A detailed operation method of the location server operation can be based on the following embodiments.

Figure 23:
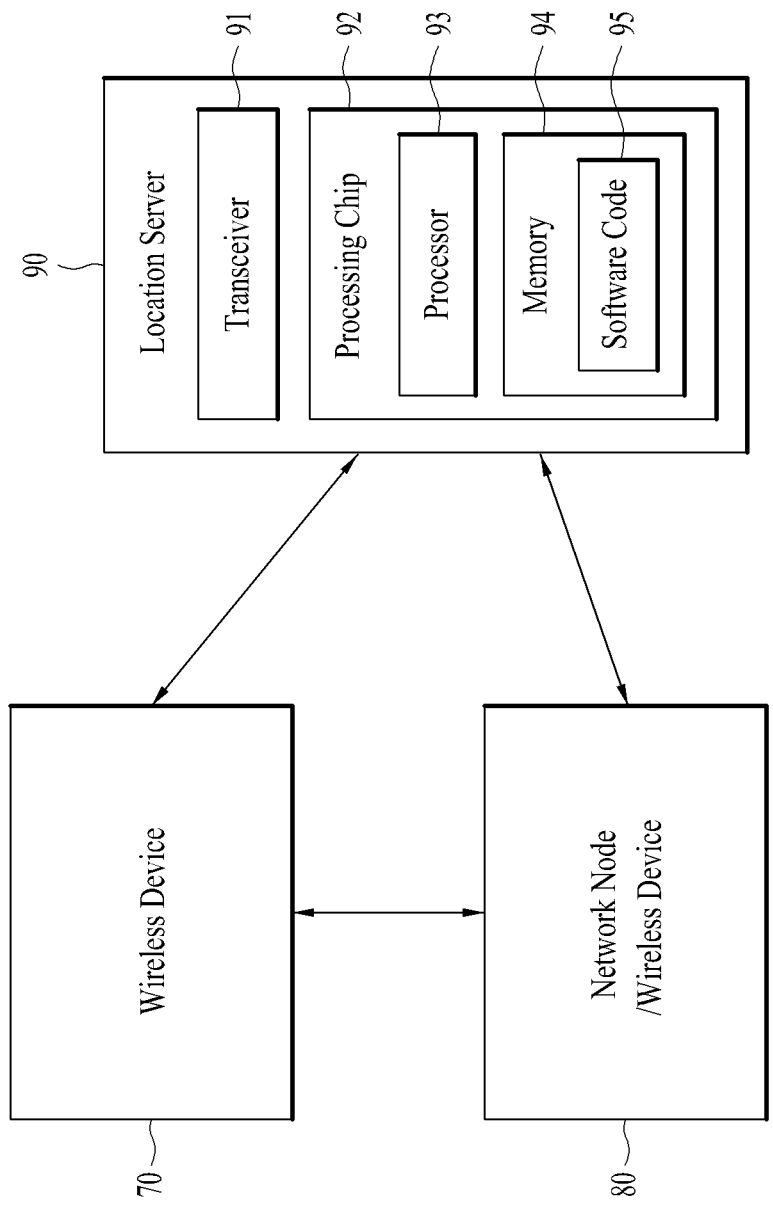
FIG. 23 illustrates an exemplary location server to which embodiments of the present disclosure are applied.

The location server shown in FIG. 16 may refer to the location server 90 shown in FIG. 23. In other words, the operation of the location server shown in FIG. 17 can be performed or executed by the location server 90 shown in FIG. 23.

FIG. 17 is a flowchart illustrating operations of a network according to the present disclosure. Referring to FIG. 17, the location server may transmit information related to UL-PRS/SRS configuration to the UE and/or the BS (S1701~S1703). If the location server does not transmit information about UL-PRS/SRS configuration to the UE, the BS may transmit the information about UL-PRS/SRS configuration to the UE (S1705). In other words, if step S1703 is omitted, step S1705 may be performed. If step S1703 is performed, step S1705 may not be performed.

The BS may transmit the DL signal for pathloss measurement (S1707). The UE may measure the pathloss value based on the DL signal received not only from the above-mentioned BS, but also from at least one TP/BS/cell (S1709). The UE may determine power of each of the UL-PRS/SRS required to transmit the plurality of TPs/BSs/cells on the basis of the pathloss value (S1711), and may transmit each of the UL-PRS/SRS to the plurality of TPs/BSs/cells through different resources on the basis of the determined power (S1713). The BS may acquire ToA (Time of Arrival) based on the received UL-PRS/SRS (S1715), and may report ToA-related information to the location server (S1717). The location server may acquire the UE position based on the ToA-related information. A detailed operation method for the network operations shown in FIG. 17 can be based on the following embodiments.

(1) Embodiment 1

When the UE attempts to transmit the UL-PRS/SRS signal to the BS/TP, the UL-PRS/SRS signal to be transmitted can be divided into two UL-PRS/SRS signals and then transmitted. The first UL-PRS/SRS signal may be controlled in power on the basis of the serving cell, and may then be transmitted. For example, the first UL-PRS/SRS signal power can be determined based on the pathloss value of the serving cell. The second UL-PRS/SRS signal can be transmitted with maximum power of the UE.

Resources of the first UL-PRS/SRS signal and resources of the second UL-PRS/SRS can be distinguished from each other. As a result, when the BS receives the UL-PRS/SRS, interference between two UL-PRS/SRS signals can be minimized In other words, the first UL-PRS/SRS signal and the second UL-PRS/SRS signal can be transmitted through different resources.

In addition, the muting operation can be performed through transmission (Tx) resources of the second UL-PRS/SRS so that another UE is unable to transmit the UL signal through the Tx resources of the second UL-PRS/SRS. This is because the second UL-PRS/SRS signal to be transmitted with maximum power of the UE does not cause interference to UL signals of other UEs.

In addition, the first UL-PRS/SRS signal can be received by TPs/BSs located close to the UE, and the second UL-PRS/SRS signal can be received by TPs/BSs located far from the UE. Two UL-PRS/SRS signals can be transmitted through different resources, so that hearability (i.e., audibility) reduction caused by the near-far problem can be minimized.

(2) Embodiment 2

When the UE transmits the UL-PRS/SRS signal to the plurality of TPs/BSs, the UL-PRS/SRS signal to be transmitted can be divided into two UL-PRS/SRS signals and then transmitted. The first UL-PRS/SRS signal may be controlled in power on the basis of the serving cell, and may then be transmitted. For example, the first UL-PRS/SRS signal power can be determined based on the pathloss value of the serving cell.

The second UL-PRS/SRS signal may measure the pathloss value of the farthest TP/BS, power of the second UL-PRS/SRS signal may be controlled based on the measured pathloss value, and the power control result may then be transmitted. In this case, the pathloss value may be measured through DL signals to be transmitted by the plurality of TPs/BSs. The UE may recognize one TP/BS, which corresponds to one DL signal having a small intensity of reception (Rx) power from among the plurality of DL signals received from the plurality of TPs/BSs, to be the farthest TP/BS. In other words, the BS may control power of the second UL-PRS/SRS signal based on one DL signal having the smallest intensity of Rx power from among DL signals received from the plurality of TPs/BSs.

On the other hand, the DL signal for measuring the pathloss value may refer to a Synchronization Signal Block (SSB) and/or a Downlink Positioning Reference Signal (DL-PRS).

In addition, resources of the first UL-PRS/SRS signal and resources of the second UL-PRS/SRS signal can be distinguished from each other. As a result, when the BS receives the UL-PRS/SRS signals, interference between two UL-PRS/SRS signals can be minimized In other words, the first UL-PRS/SRS signal and the second UL-PRS/SRS signal can be transmitted through different resources.

In addition, the muting operation can be performed through transmission (Tx) resources of the second UL-PRS/SRS so that another UE is unable to transmit the UL signal through the Tx resources of the second UL-PRS/SRS. Since the UE determines power of the second UL-PRS/SRS signal based on the farthest TP/BS, there is a high possibility that the second UL-PRS/SRS signal has a higher power than a general UL signal, so that the second UL-PRS/SRS signal to be transmitted with relatively high power may not cause interference to UL signals of other UEs.

In addition, the first UL-PRS/SRS signal can be received by TPs/BSs located close to the UE, and the second UL-PRS/SRS signal can be received by TPs/BSs located far from the UE. Two UL-PRS/SRS signals can be transmitted through different resources, so that hearability (audibility) reduction caused by the near-far problem can be minimized.

(3) Embodiment 3

When the UE transmits the UL-PRS/SRS signal to the plurality of TPs/BSs, the UL-PRS/SRS signal to be transmitted can be divided into two UL-PRS/SRS signals and then transmitted. The first UL-PRS/SRS signal may be controlled in power on the basis of the nearest TP/BS, and may then be transmitted. For example, the UE may recognize one TP/BS, which corresponds to one DL signal having the largest intensity of reception (Rx) power among DL signals received from the plurality of TPs/BSs, to be the nearest TP/BS. Therefore, the UE may measure the pathloss value based on one DL signal having the largest intensity of Rx power from among DL signals received from the plurality of TPs/BSs. In addition, the UE may perform power control of the first UL-PRS/SRS signal based on the measured pathloss value, and may then transmit the resultant value. Meanwhile, the DL signal for measuring the pathloss value may refer to an SSB (Synchronization Signal Block) and/or a DL-PRS (Downlink Positioning Reference Signal).

The second UL-PRS/SRS signal can be transmitted with maximum power of the UE.

In addition, resources of the first UL-PRS/SRS signal and resources of the second UL-PRS/SRS signal can be distinguished from each other. As a result, when the BS receives the UL-PRS/SRS signals, interference between two UL-PRS/SRS signals can be minimized In other words, the first UL-PRS/SRS signal and the second UL-PRS/SRS signal can be transmitted through different resources.

In addition, the muting operation can be performed through transmission (Tx) resources of the second UL-PRS/SRS so that another UE is unable to transmit the UL signal through the transmission (Tx) resources of the second UL-PRS/SRS. This is because the second UL-PRS/SRS signal transmitted with maximum power of the UE cannot cause interference to UL signals of other UEs.

In addition, the first UL-PRS/SRS signal can be received by TPs/BSs located close to the UE, and the second UL-PRS/SRS signal can be received by TPs/BSs located far from the UE. Two UL-PRS/SRS signals can be transmitted through different resources, so that hearability (audibility) reduction caused by the near-far problem can be minimized.

(4) Embodiment 4

When the UE transmits the UL-PRS/SRS signal to the plurality of TPs/BSs, the UL-PRS/SRS signal to be transmitted can be divided into two UL-PRS/SRS signals and then transmitted. The first UL-PRS/SRS signal may be controlled in power on the basis of the nearest TP/BS, and may then be transmitted. For example, the UE may recognize one TP/BS, which corresponds to one DL signal having the largest intensity of reception (Rx) power among DL signals received from the plurality of TPs/BSs, to be the nearest TP/BS. Therefore, the UE may measure the pathloss value based on one DL signal having the largest intensity of Rx power from among DL signals received from the plurality of TPs/BSs. In addition, the UE may perform power control of the first UL-PRS/SRS signal based on the measured pathloss value, and may then transmit the resultant value.

The second UL-PRS/SRS signal may measure the pathloss value of the farthest TP/BS, power of the second UL-PRS/SRS signal may be controlled based on the measured pathloss value, and the power control result may then be transmitted. For example, the UE may recognize one TP/BS corresponding to one DL signal having a small intensity of Rx power from among DL signals received by the plurality of TPs/BSs, to be the farthest TP/BS. In other words, the BS may control power of the second UL-PRS/SRS signal based on one DL signal having the smallest intensity of Rx power from among DL signals received from the plurality of TPs/BSs.

Meanwhile, the DL signal for measuring the pathloss value may refer to an SSB (Synchronization Signal Block) and/or a DL-PRS (Downlink Positioning Reference Signal).

In addition, resources of the first UL-PRS/SRS signal and resources of the second UL-PRS/SRS signal can be distinguished from each other. As a result, when the BS receives the UL-PRS/SRS signals, interference between two UL-PRS/SRS signals can be minimized In other words, the first UL-PRS/SRS signal and the second UL-PRS/SRS signal can be transmitted through different resources.

In addition, the muting operation can be performed through transmission (Tx) resources of the second UL-PRS/SRS so that another UE is unable to transmit the UL signal through the Tx resources of the second UL-PRS/SRS. Since the UE determines power of the second UL-PRS/SRS signal based on the farthest TP/BS, there is a high possibility that the second UL-PRS/SRS signal has a higher power than a general UL signal, so that the second UL-PRS/SRS signal to be transmitted with relatively high power may not cause interference to UL signals of other UEs.

In addition, the first UL-PRS/SRS signal can be received by TPs/BSs located close to the UE, and the second UL-PRS/SRS signal can be received by TPs/BSs located far from the UE. Two UL-PRS/SRS signals can be transmitted through different resources, so that hearability (audibility) reduction caused by the near-far problem can be minimized.

(5) Embodiment 5

When the UE transmits the UL-PRS/SRS signal to the plurality of TPs/BSs, the UL-PRS/SRS signal to be transmitted can be divided into three UL-PRS/SRS signals and then transmitted. The first UL-PRS/SRS signal may be controlled in power on the basis of the nearest TP/BS, and may then be transmitted. For example, the UE may recognize one TP/BS, which corresponds to one DL signal having the largest intensity of reception (Rx) power among DL signals received from the plurality of TPs/BSs, to be the nearest TP/BS. Therefore, the UE may measure the pathloss value based on one DL signal having the largest intensity of Rx power from among DL signals received from the plurality of TPs/BSs. In addition, the UE may perform power control of the first UL-PRS/SRS signal based on the measured pathloss value, and may then transmit the resultant value. Meanwhile, the DL signal for measuring the pathloss value may refer to an SSB(Synchronization Signal Block) and/or a DL-PRS (Downlink Positioning Reference Signal).

Power of the second UL-PRS/SRS signal may be controlled based on the serving cell, and the power control result may then be transmitted. For example, power of the second UL-PRS/SRS signal can be determined based on the pathloss value of the serving cell.

A third UL-PRS/SRS signal may be transmitted with maximum power of the UE.

In addition, resources of the first UL-PRS/SRS signal, resources of the second UL-PRS/SRS signal, and resources of the third UL-RS/SRS signal can be distinguished from each other. As a result, when the BS receives the UL-PRS/SRS signals distinguished from each other, interference between three UL-PRS/SRS signals can be minimized In other words, the first UL-PRS/SRS signal, the second UL-PRS/SRS signal, and the third UL-PRS/SRS signal can be transmitted through different resources.

However, resources for three UL-PRS/SRS signals need not always be allocated in different ways. For example, resources of the first UL-PRS/SRS signal may overlap with all or some of resources of the second UL-PRS/SRS signal, and the third UL-PRS/SRS signal may be transmitted on resources different from the corresponding resources.

In addition, the muting operation can be performed through transmission (Tx) resources of the third UL-PRS/SRS so that another UE is unable to transmit the UL signal through the Tx resources of the third UL-PRS/SRS. This is because the third UL-PRS/SRS signal transmitted with maximum power of the UE cannot cause interference to UL signals of other UEs.

The first UL-PRS/SRS signal and the second UL-PRS/SRS signal can be received by TPs/BSs located close to the UE, and the third UL-PRS/SRS signal can be received by TPs/BSs located far from the UE. Three UL-PRS/SRS signals can be transmitted through different resources, so that hearability (audibility) reduction caused by the near-far problem can be minimized.

(6) Embodiment 6

When the UE transmits the UL-PRS/SRS signal to the plurality of TPs/BSs, the UL-PRS/SRS signal to be transmitted can be divided into three UL-PRS/SRS signals and then transmitted.

The first UL-PRS/SRS signal may be controlled in power on the basis of the nearest TP/BS, and may then be transmitted. For example, the UE may recognize one TP/BS, which corresponds to one DL signal having the largest intensity of reception (Rx) power among DL signals received from the plurality of TPs/BSs, to be the nearest TP/BS. Therefore, the UE may measure the pathloss value based on one DL signal having the largest intensity of Rx power from among DL signals received from the plurality of TPs/BSs. In addition, the UE may perform power control of the first UL-PRS/SRS signal based on the measured pathloss value, and may then transmit the resultant value.

Power of the second UL-PRS/SRS signal may be controlled based on the serving cell, and the power control result may then be transmitted.

The third UL-PRS/SRS signal may measure the pathloss value of the farthest TP/BS, power of the third UL-PRS/SRS signal may be controlled based on the measured pathloss value, and the power control result may then be transmitted. For example, the UE may recognize one TP/BS, which corresponds to one DL signal having a small intensity of reception (Rx) power from among the plurality of DL signals received from the plurality of TPs/BSs, to be the farthest TP/BS. In other words, the BS may control power of the third UL-PRS/SRS signal based on one DL signal having the smallest intensity of Rx power from among DL signals received from the plurality of TPs/BSs.

Meanwhile, the DL signal for measuring the pathloss value may refer to an SSB(Synchronization Signal Block) and/or a DL-PRS (Downlink Positioning Reference Signal).

In addition, resources of the first UL-PRS/SRS signal, resources of the second UL-PRS/SRS signal, and resources of the third UL-PRS/SRS signal can be distinguished from each other. As a result, when the BS receives three UL-PRS/SRS signals, interference between the three UL-PRS/SRS signals can be minimized. In other words, the first UL-PRS/SRS signal, the second UL-PRS/SRS signal, and the third UL-PRS/SRS signal can be transmitted through different resources.

However, resources for three UL-PRS/SRS signals need not always be allocated in different ways. For example, resources of the first UL-PRS/SRS signal may overlap with all or some of resources of the second UL-PRS/SRS signal, and the third UL-PRS/SRS signal may be transmitted on resources different from the corresponding resources.

In addition, the muting operation can be performed through transmission (Tx) resources of the third UL-PRS/SRS so that another UE is unable to transmit the UL signal through the Tx resources of the third UL-PRS/SRS. Since the UE determines power of the third UL-PRS/SRS signal based on the farthest TP/BS, there is a high possibility that the third UL-PRS/SRS signal has a higher power than a general UL signal, so that the third UL-PRS/SRS signal to be transmitted with relatively high power may not cause interference to UL signals of other UEs.

The first UL-PRS/SRS signal and the second UL-PRS/SRS signal can be received by TPs/BSs located close to the UE, and the third UL-PRS/SRS signal can be received by TPs/BSs located far from the UE. Three UL-PRS/SRS signals can be transmitted through different resources, so that hearability (audibility) reduction caused by the near-far problem can be minimized.

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
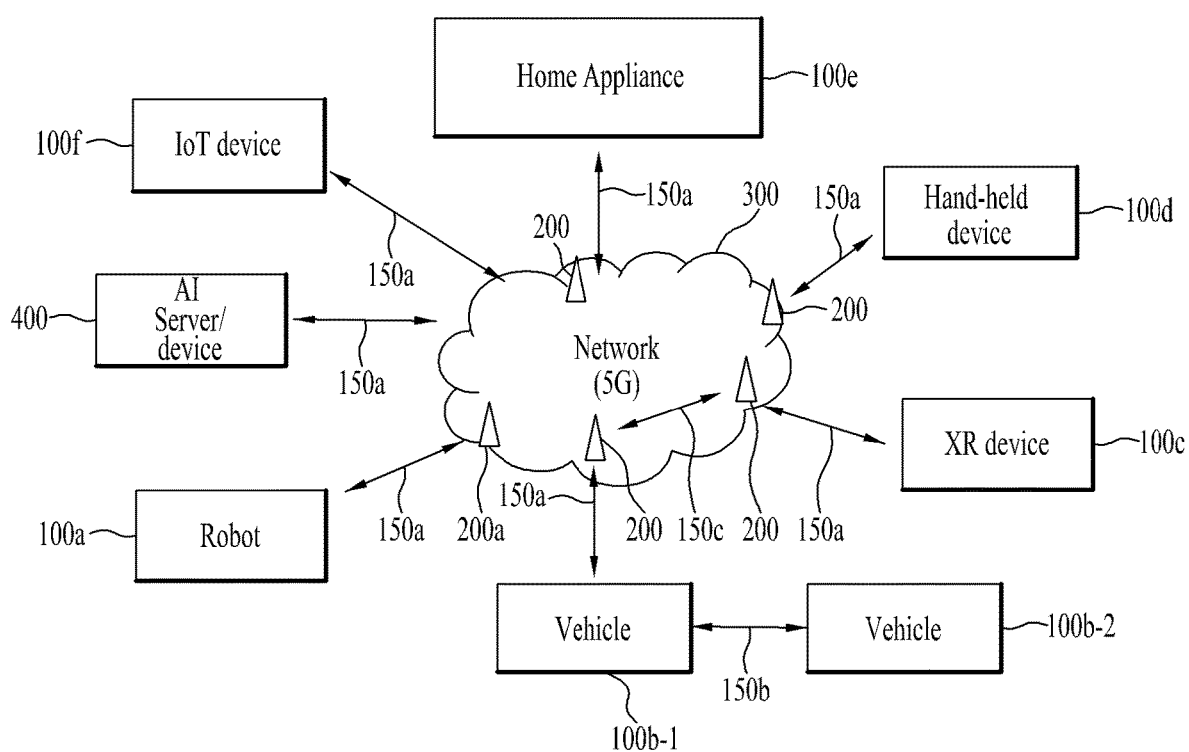
FIG. 18 illustrate a communication system 1 applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
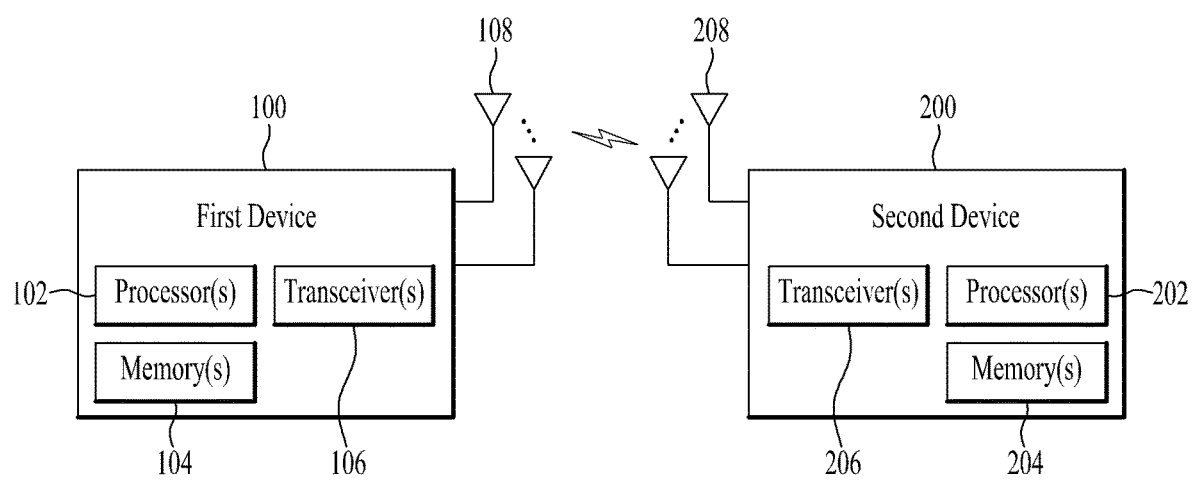
FIGS. 19 to 22 illustrate examples of various wireless devices to which embodiments of the present disclosure are applied.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

In more detail, a method for controlling instructions and/or operations by the processor 102 of the first wireless device 100, and the instructions and/or operations stored in the memory 104 will hereinafter be described with reference to the attached drawings.

Although the following operations will be disclosed based on the control operation of the processor 102 when viewed from the processor 102, it should be noted that software code, etc. required to perform such operation can be stored in the memory 104.

The processor 102 may measure the pathloss value based on a downlink (DL) signal received from at least one second wireless device 200. Further, the processor 102 may determine power of each of the plurality of UL-PRS/SRS signals to be transmitted to the plurality of second wireless devices 200 on the basis of the pathloss value, and may control the transceiver 106 to transmit each of the UL-PRS/SRS signals to the plurality of second wireless devices 200 through different resources on the basis of the determined power. A detailed operation method of the exemplary operations of the processor 102 can be based on the above-mentioned embodiments.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

In more detail, a method for controlling instructions and/or operations by the processor 202 of the second wireless device 200, and the instructions and/or operations stored in the memory 204 will hereinafter be described with reference to the attached drawings.

Although the following operations will be disclosed based on the control operation of the processor 202 when viewed from the processor 202, it should be noted that software code, etc. required to perform such operation can be stored in the memory 204.

The processor 202 may control the transceiver 206 to transmit the DL signal required for pathloss measurement. The processor 202 may control the transceiver 206 to receive the UL-PRS/SRS signal based on the second wireless device 200's power decided based on the measured pathloss value. The processor 202 may acquire ToA (Time of Arrival) based on the UL-PRS/SRS signal, and may control the transceiver 206 to report ToA information to the location server 90 shown in FIG. 23. A detailed operation method of the exemplary operations of the processor 202 can be based on the above-mentioned embodiments.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

Figure 20:
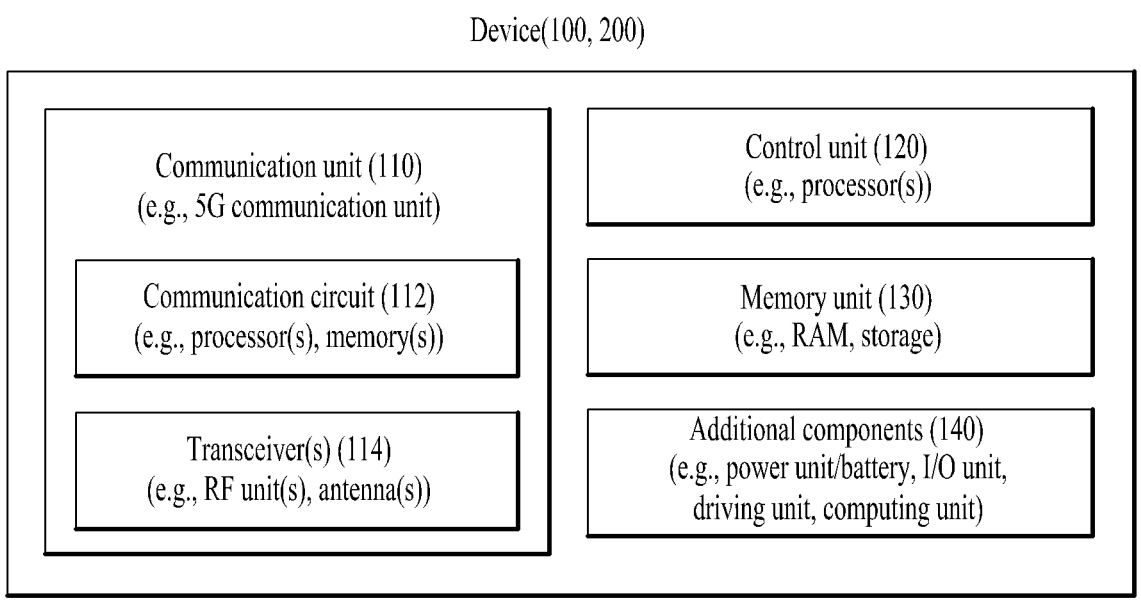

FIG. 20 illustrates another example of a wireless device applied to the present disclosure. The wireless device may be implemented in various forms according to a use case/service (refer to FIG. 18).

Referring to FIG. 20, wireless devices 100 and 200 may correspond to the wireless devices 100 and 200 of FIG. 20 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 19. For example, the transceiver(s) 114 may include the one or more transceivers 106 and 206 and/or the one or more antennas 108 and 208 of FIG. 19. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 18), the vehicles (100b-1 and 100b-2 of FIG. 18), the XR device (100c of FIG. 18), the hand-held device (100d of FIG. 18), the home appliance (100e of FIG. 18), the IoT device (100f of FIG. 18), a digital broadcasting terminal, a hologram device, a public safety device, an MTC device, a medical device, a FinTech device (or a finance device), a security device, a climate/environment device, the AI server/device (400 of FIG. 18), the BSs (200 of FIG. 18), a network node, or the like. The wireless device may be mobile or fixed according to a use case/service.

In FIG. 20, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

The implementation example of FIG. 20 will hereinafter be described with reference to the attached drawings.

Figure 21:
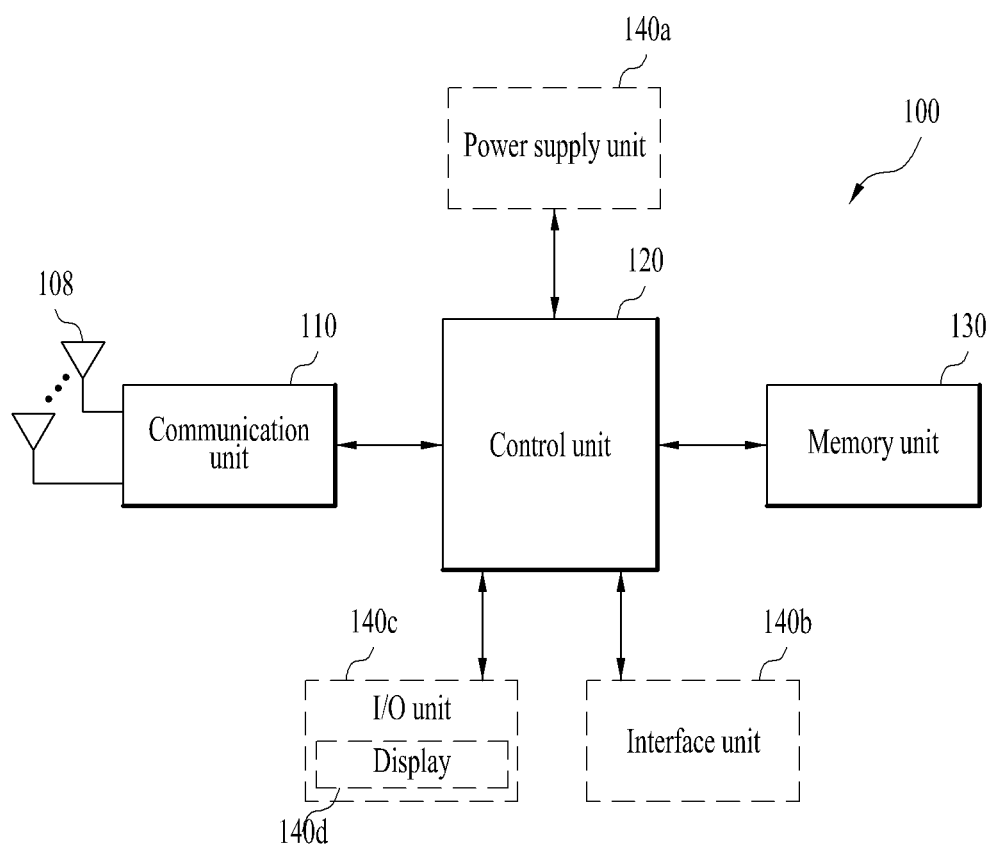

FIG. 21 is a block diagram illustrating a hand-held device 100 to which another embodiment of the present disclosure can be applied. The hand-held device may include a smartphone, a tablet (also called a smartpad), a wearable device (e.g., a smartwatch or smart glasses), and a portable computer (e.g., a laptop). The hand-held device 100 may be referred to as a mobile station (MS), a user terminal (UT), a mobile subscriber station (MSS), a subscriber station (SS), an advanced mobile station (AMS), or a wireless terminal (WT).

Referring to FIG. 21, the hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. The blocks 110 to 130/140a to 140c correspond to the blocks 110 to 130/140 of FIG. 21, respectively.

The communication unit 110 may transmit and receive signals (e.g., data and control signals) to and from another wireless device and a BS. The control unit 120 may perform various operations by controlling elements of the hand-held device 100. The control unit 120 may include an application processor (AP). The memory unit 130 may store data/parameters/programs/code/commands required for operation of the hand-held device 100. Further, the memory unit 130 may store input/output data/information. The power supply unit 140a may supply power to the hand-held device 100, and include a wired/wireless charging circuit and a battery. The interface unit 140b may support connection between the hand-held device and other external devices. The interface unit 140b may include various ports (e.g., an audio I/O port and a video I/O port) for connection to external devices. The I/O unit 140c may receive or output video information/signal, audio information/signal, data, and/or user-input information. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signals in the memory unit 130. The communication unit 110 may convert the information/signals into radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 22:
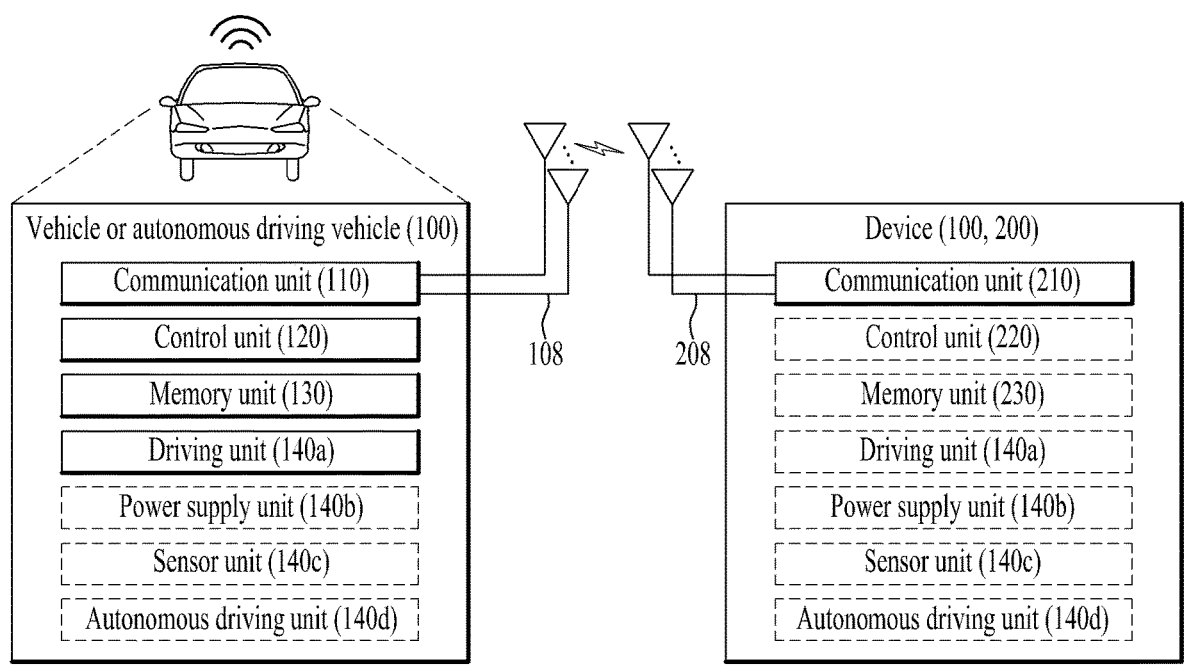

FIG. 22 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 20, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Meanwhile, in order to perform the implementation examples disclosed in this patent document, the location server 90 shown in FIG. 23 may be used. The location server 90 may be logically or physically connected to a wireless device 70 and/or a network node 80. The wireless device 70 may be the first wireless device 100 of FIG. 20 and/or the wireless device 100 or 200 of FIG. 18. The network node 80 may be the second wireless device 100 of FIG. 18 and/or the wireless device 100 or 200 of FIG. 19.

The location server 90 may be, without being limited to, an AMF, an LMF, an E-SMLC, and/or an SLP and may be any device only if the device serves as the location server 90 for implementing the embodiments of the present disclosure. Although the location server 90 is referred to as a location server for convenience of description, the location server 90 may be implemented not as a server but as a chip. Such a chip may be implemented to perform all functions of the location server 90 which will be described below.

Specifically, the location server 90 includes a transceiver 91 for communicating with one or more other wireless devices, network nodes, and/or other elements of a network. The transceiver 91 may include one or more communication interfaces. The transceiver 91 communicates with one or more other wireless devices, network nodes, and/or other elements of the network connected through the communication interfaces.

The location server 90 includes a processing chip 92. The processing chip 92 may include at least one processor, such as a processor 93, and at least one memory device, such as a memory 94.

The processing chip 92 may control one or more processes to implement the methods described in this specification and/or embodiments for problems to be solved by this specification and solutions to the problems. In other words, the processing chip 92 may be configured to perform at least one of the embodiments described in this specification. That is, the processor 93 includes at least one processor for performing the function of the location server 90 described in this specification. For example, one or more processors may control the one or more transceivers 91 of FIG. 24 to transmit and receive information.

The processing chip 92 includes a memory 94 configured to store data, programmable software code, and/or other information for performing the embodiments described in this specification.

In other words, in the embodiments according to the present specification, when the memory 94 is executed by at least one processor such as the processor 93, the memory 94 allows the processor 93 to perform some or all of the processes controlled by the processor 93 of FIG. 23 or stores software code 95 including instructions for performing the embodiments described in this specification.

In more detail, a method for controlling instructions and/or operations by the processor 93 of the location server 90, and the instructions and/or operations stored in the memory 94 will hereinafter be described with reference to the attached drawings.

Although the following operations will be disclosed based on the control operation of the processor 93 when viewed from the processor 93, it should be noted that software code, etc. required to perform such operation can be stored in the memory 94.

The processor 93 may control the transceiver 91 to transmit ToA-related information from the second wireless device 200 shown in FIG. 19. The processor 93 may obtain the position of the first wireless device 100 shown in FIG. 19 based on the ToA-related information. The processor 202 may acquire ToA (Time of Arrival) based on the UL-PRS/SRS signal, and may control the transceiver 206 to report ToA information to the location server 90 shown in FIG. 23. A detailed operation method of the exemplary operations of the processor 93 can be based on the above-mentioned embodiments.

Figure 24:
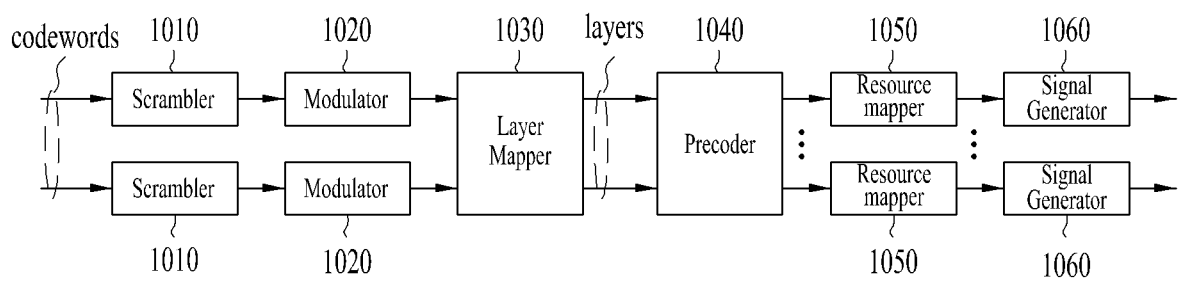
FIG. 24 illustrates an exemplary signal processing circuit to which embodiments of the present disclosure are applied.

FIG. 24 illustrates a signal processing circuit for transmission (Tx) signals.

Referring to FIG. 24, a signal processing circuit 1000 may include a scrambler 1010, a modulator 1020, a layer mapper 1030, a precoder 1040, a resource mapper 1050, and a signal generator 1060. The operations/functions shown in FIG. 24 may be performed by the processors 102 and 202 and/or the transceivers 106 and 206 shown in FIG. 19, without being limited thereto. Hardware elements shown in FIG. 19 may be implemented by the processors 102 and 202 and/or the transceivers 106 and 206 shown in FIG. 19. For example, the blocks 1010 to 1060 may be implemented by the processors 102 and 202. In addition, the blocks 1010 to 1050 may be implemented by the processors 102 and 202 shown in FIG. 19, and the block 1060 may be implemented by the transceivers 106 and 206 shown in FIG. 19.

The codeword may be converted into a radio signal (or a radio frequency (RF) signal) through the signal processing circuit 1000 shown in FIG. 24. Here, the codeword may be a coded bit sequence of an information block. The information block may include a transmission (Tx) block (e.g., UL-SCH transmission block, and/or DL-SCH transmission block). The radio signal may be transmitted through various physical channels (e.g., PUSCH, and PDSCH).

In more detail, the codeword may be converted into a bit sequence scrambled by the scrambler 1010. The scramble sequence used for such scrambling may be generated based on an initialization value, and the initialization value may include ID information of a wireless device, etc. The scrambled bit-sequence may be modulated into a modulated symbol sequence by the demodulator 1020. The modulation scheme may include pi/2-BPSK(pi/2-Binary Phase Shift Keying), m-PSK (m-Phase Shift Keying), m-QAM (m-Quadrature Amplitude Modulation), etc. The complex modulated symbol sequence may be mapped to one or more transmission (Tx) layers by the layer mapper 1030. Modulated symbols of the respective Tx layers may be mapped (precoded) to the corresponding antenna port(s) by the precoder 1040. The output value (z) of the precoder 1040 may be obtained by multiplying the output value (y) of the layer mapper 1030 by the (N×M) precoding matrix (W). In this case, N is the number of antenna ports, and M is the number of Tx layers. In this case, the precoder 1040 may perform precoding after transform precoding (e.g., DFT transform) is performed on the complex modulated symbols. In this case, the precoder 1040 may perform precoding without performing transform precoding.

The resource mapper 1050 may map the modulated symbols of the respective antenna ports to time-frequency resources. The time-frequency resources may include a plurality of symbols (e.g., CP-OFDMA symbol and DFT-s-OFDMA symbol) in the time domain, and may include a plurality of subcarriers in the frequency domain. The signal generator 1060 may generate radio signals from the mapped modulated symbols, and the generated radio signals may be transferred to other devices through the respective antennas. To this end, the signal generator 1060 may include an inverse fast Fourier transform (IFFT) module, a cyclic prefix (CP) inserter, a digital-to-analog converter (DAC), a frequency uplink converter, etc.

Figure 25:
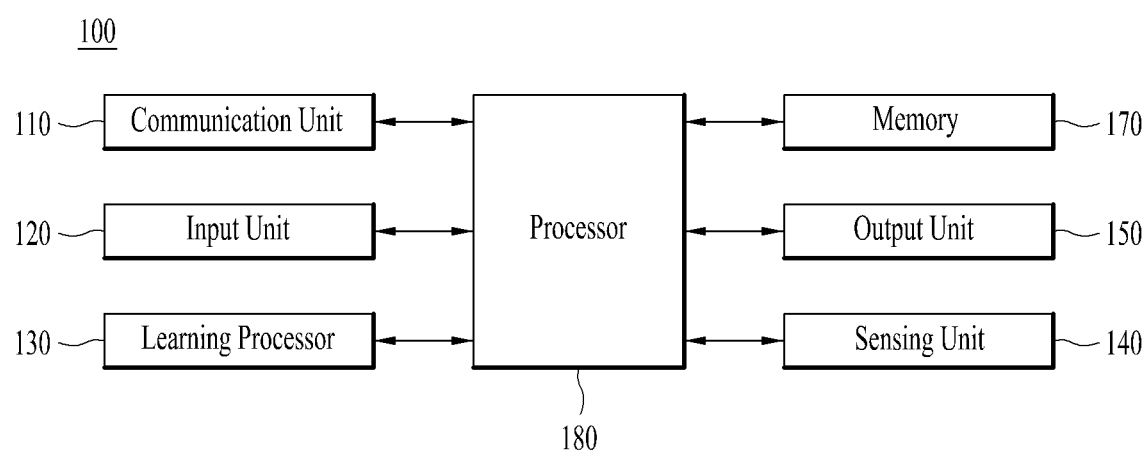
FIGS. 25 and 26 are diagrams illustrating an AI apparatus and AI system according to an embodiment of the present disclosure.

The signal processing steps for reception (Rx) signals in the wireless device may be arranged in the reverse order of the signal processing steps 1010 to 1060 shown in FIG. 25. For example, the wireless devices 100 and 200 (shown in FIG. 20) may receive radio signals from the outside through the antenna ports/transceivers. The received radio signals may be converted into a baseband signal through a signal restorer. To this end, the signal restorer may include a frequency downlink converter, an analog-to-digital converter (ADC), a CP remover, and a fast Fourier transform (FFT) module. Thereafter, the baseband signal may be restored to the codeword after passing through the resource demapper process, the postcoding process, the demodulation process, and the descrambling process. The codeword may be restored to an original information block through decoding. Therefore, the signal processing circuit (not shown) for Rx signals may include a signal restorer, a resource demapper, a postcoder, a demodulator, a descrambler, and a decoder.

FIG. 25 illustrates an AI device 100 according to an embodiment of the present disclosure.

The AI device 100 may be implemented by a stationary or mobile device, for example, a TV, a projector, a mobile phone, a smartphone, a desktop computer, a laptop computer, a digital broadcasting terminal, a personal digital assistant (PDA), a portable multimedia player (PMP), a navigation device, a tablet PC, a wearable device, a set-top box (STB), a digital multimedia broadcasting (DMB) receiver, a radio, a washing machine, a refrigerator, a desktop computer, a digital signage, a robot, a vehicle, etc.

Referring to FIG. 25, the AI device 100 may include a communication unit 110, an input unit 120, a learning processor 130, a sensing unit 140, an output unit 150, a memory 170, and a processor 180.

The communication unit 110 may transmit and receive data to and from external devices such as an AI server 200 and other AI devices 100a to 100e based on wired or wireless communication technology. For example, the communication unit 110 may transmit and receive sensor information, user inputs, learning models, and control signals to and from the external devices.

The communication technology used by the communication unit 110 includes Global System for Mobile communication (GSM), Code Division Multiple Access (CDM), Long Term Evolution (LTE), 5G, Wireless Local Area Network (WLAN), Wireless Fidelity (Wi-Fi), Bluetooth™, Radio Frequency Identification (RFID), Infrared Data Association (IrDA), ZigBee, Near Field Communication (NFC), etc.

The input unit 120 may obtain various types of data.

The input unit 120 may include a camera for inputting a video signal, a microphone for receiving an audio signal, and a user input unit for receiving information from a user. The camera or microphone may be treated as a sensor, and the signal obtained from the camera or microphone may be considered as sensing data or sensor information.

The input unit 120 may obtain learning data for a learning model and input data to be used when an output is obtained based on the learning model. The input unit 120 may obtain raw input data. In this case, the processor 180 or learning processor 130 may extract an input feature by preprocessing the input data.

The learning processor 130 may train a model configured with an ANN based on the learning data. Here, the trained ANN may be referred to as the learning model. The learning model may be used to infer a result value for new input data rather than the learning data, and the inferred value may be used as a basis for determining whether to perform a certain operation.

In this case, the learning processor 130 may perform AI processing together with a learning processor 240 of the AI server 200.

The learning processor 130 may include a memory integrated with or implemented in the AI device 100. Alternatively, the learning processor 130 may be implemented with the memory 170, an external memory directly coupled to the AI device 100, or a memory in an external device.

The sensing unit 140 may obtain at least one of internal information of the AI device 100, surrounding environment information of the AI device 100, and user information using various sensors.

The sensor included in the sensing unit 140 may include a proximity sensor, an illumination sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a LIDAR, a radar, and the like.

The output unit 150 may generate an output related to visual, audible, or tactile sense.

The output unit 150 may include a display unit for outputting visual information, a speaker for outputting audible information, a haptic module for outputting tactile information, and the like.

The memory 170 may store data supporting various functions of the AI device 100. For example, the memory 170 may store input data, learning data, learning models, learning histories, etc. obtained by the input unit 120.

The processor 180 may determine at least one executable operation of the AI device 100 based on information determined or generated by a data analysis algorithm or machine learning algorithm. The processor 180 may control the components of the AI device 100 to perform the determined operation.

To this end, the processor 180 may request, search for, receive, or employ data of the learning processor 130 or memory 170 and control the components of the AI device 100 to execute an expected or preferable operation or among the one or more executable operations.

If the processor 180 requires association with an external device to perform the determined operation, the processor 180 may generate a control signal for controlling the corresponding external device and transmit the generated control signal to the external device.

The processor 180 may obtain intention information from a user input and determine the intention of the user based on the obtained intention information.

In this case, the processor 180 may obtain the intention information corresponding to the user input using at least one of a speech-to-text (STT) engine for converting a voice input into a character string or a natural language processing (NLP) engine for obtaining intention information from a natural language.

At least one of the STT engine and the NLP engine may be configured with the ANN of which at least a part is trained according to the machine learning algorithm. At least one of the STT engine and the NLP engine may be trained by the learning processor 130, by the learning processor 240 of the AI server 200, or by distributed processing thereof.

The processor 180 may collect history information including user feedback on the operation of the AI device 100 and details thereof. The processor 180 may store the history information in the memory 170 or learning processor 130 or transmit the history information to an external device such as the AI server 200. The collected history information may be used to update the learning model.

The processor 180 may control at least some of the components of the AI device 100 to drive an application program stored in the memory 170. Further, the processor 180 may operate two or more of the components included in the AI device 100 in combination to drive the application program.

Figure 26:
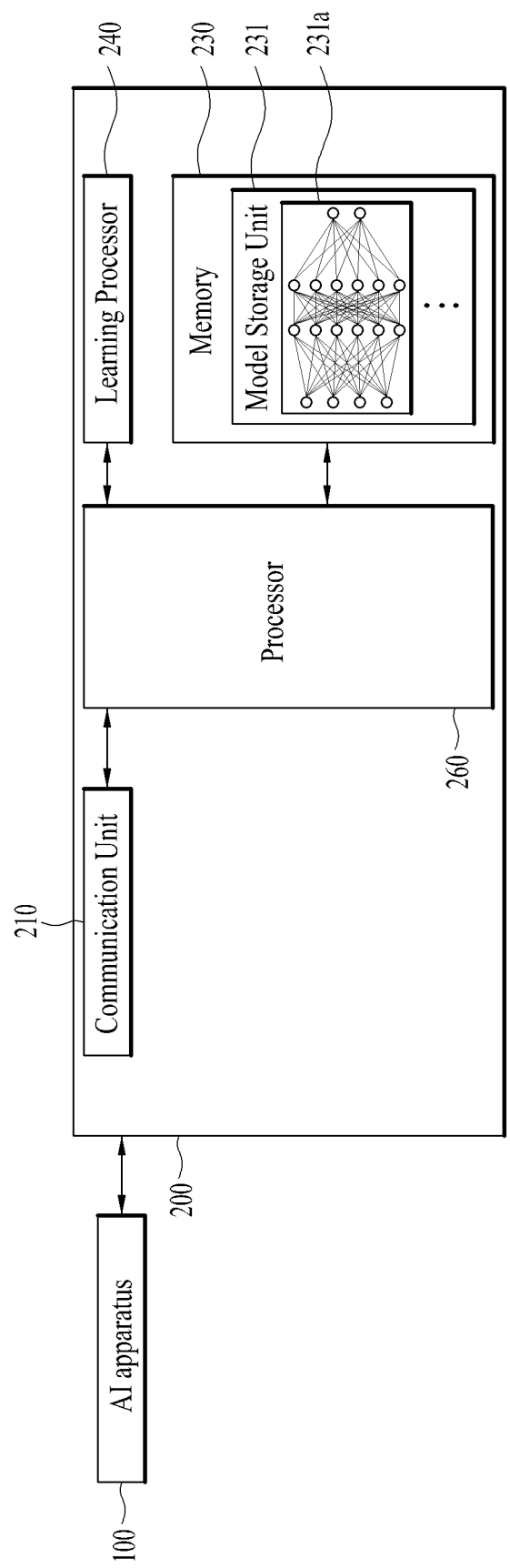

FIG. 26 illustrates the AI server 200 according to an embodiment of the present disclosure.

Referring to FIG. 26, the AI server 200 may mean a device for training an ANN based on a machine learning algorithm or a device for using a trained ANN. Here, the AI server 200 may include a plurality of servers to perform distributed processing or may be defined as a 5G network. The AI server 200 may be included as a part of the AI device 100 to perform at least part of AI processing together.

The AI server 200 may include a communication unit 210, a memory 230, the learning processor 240, a processor 260, and the like.

The communication unit 210 may transmit and receive data to and from an external device such as the AI device 100.

The memory 230 may include a model storage unit 231. The model storage unit 231 may store a model being trained or trained (or an ANN 231*a*) through the learning processor 240.

The learning processor 240 may train the ANN 231*a* based on learning data. The ANN, i.e., a learning model may be included in the AI server 200 or in an external device such as the AI device 100.

The learning model may be implemented by hardware, software or a combination thereof. If a part or the entirety of the learning model is implemented with software, one or more instructions for the learning model may be stored in the memory 230.

The processor 260 may infer a result value for new input data based on the learning model and generate a response or control command based on the inferred result value.

FIG. 18 illustrates an AI system 1 according to an embodiment of the present disclosure. Referring to FIG. 18, at least one of the AI server 200, a robot 100*a*, an autonomous driving vehicle 100*b*, an XR device 100*c*, a smartphone 100*d*, and a home appliance 100*e* is connected to a cloud server 10 in the AI system 1. Here, the robot 100*a*, the autonomous vehicle 100*b*, the XR device 100*c*, the smartphone 100*d*, or the home appliance 100*e*, to which the AI technology is applied, may be referred to as an AI device 100*a* to 100*e*.

The cloud network 10 may refer to a network configuring part of a cloud computing infrastructure or a network existing in the cloud computing infrastructure. Here, the cloud network 10 may be configured with a 3G network, a 4G or LTE network, or a 5G network.

That is, each of the devices 100*a* to 100*e* and 200 included in the AI system 1 may be connected to each other through the cloud network 10. In particular, the devices 100*a* to 100*e* and 200 may communicate with each other through a BS or may communicate with each other directly without the BS.

The AI server 200 may include a server in charge of AI processing and a server in charge of big data computation.

The AI server 200 may be connected to at least one of the robot 100*a*, the autonomous vehicle 100*b*, the XR device 100*c*, the smartphone 100*d*, or the home appliance 100*e* included in the AI system 1 via the cloud network 10 and help at least part of AI processing of the connected AI devices 100*a* to 100*e*.

In this case, the AI server 200 may train an ANN according to a machine learning algorithm on behalf of the AI devices 100*a* to 100*e* and directly store or transmit a learning model to the AI devices 100*a* to 100*e*.

The AI server 200 may receive input data from the AI devices 100*a* to 100*e*, infer a result value for the received input data based on the learning model, generate a response or control command based on the inferred result value, and transmit the response or control command to the AI devices 100*a* to 100*e*.

Alternatively, the AI devices 100*a* to 100*e* may directly infer the result value for the input data based on the learning model and generate the response or control command based on the inferred result value.

Hereinafter, various embodiments of the AI devices 100*a* to 100*e* to which the above-described technology is applied will be described. The AI devices 100*a* to 100*e* illustrated in FIG. 20 may be considered as a specific example of the AI device 100 illustrated in FIG. 20.

<AI+Robot>

If the AI technology is applied to the robot 100*a*, the robot 100*a* may be implemented as a guide robot, a transport robot, a cleaning robot, a wearable robot, an entertainment robot, a pet robot, an unmanned flying robot, etc.

The robot 100*a* may include a robot control module for controlling an operation, and the robot control module may refer to a software module or a chip implemented by hardware.

The robot 100*a* may obtain state information of the robot 100*a*, detect (recognize) a surrounding environment and objects, generate map data, determine a travel route or driving plan, or determine a response or action to user interaction by using sensor information obtained from various types of sensors.

To determine the travel route or driving plan, the robot 100*a* may use sensor information obtained from at least one of the following sensors: a LIDAR, a radar, and a camera to determine a movement route and a travel plan.

The robot 100*a* may perform the above-described operations based on a learning model configured with at least one ANN. For example, the robot 100*a* may recognize the surrounding environment and objects based on the learning model and determine an operation based on the recognized surrounding environment or object. Here, the learning model may be directly trained by the robot 100*a* or by an external device such as the AI server 200.

The robot 100*a* may operate by directly generating a result based on the learning model. Alternatively, the robot 100*a* may transmit sensor information to the external device such as the AI server 200 and receive a result generated based on the sensor information.

The robot 100*a* may determine the travel route and driving plan based on at least one of the map data, the object information detected from the sensor information, or the object information obtained from the external device. Then, the robot 100*a* may move according to the determined travel path and driving plan under control of its driving unit.

The map data may include object identification information about various objects placed in a space in which the robot 100*a* moves. For example, the map data may include object identification information about fixed objects such as walls and doors and movable objects such as flower pots and desks. The object identification information may include a name, a type, a distance, a position, etc.

The robot 100*a* may operate and move by controlling the driving unit based on the user control/interaction. In this case, the robot 100*a* may obtain intention information from the motion or speech of the user and determine a response based on the obtained intention information.

<AI+Autonomous Driving>

If the AI technology is applied to the autonomous driving vehicle 100*b*, the autonomous driving vehicle 100*b* may be implemented as a mobile robot, a vehicle, an unmanned flying vehicle, etc.

The autonomous driving vehicle 100*b* may include an autonomous driving control module for controlling the autonomous driving function, and the autonomous driving control module may refer to a software module or a chip implemented by hardware. The autonomous driving control module may be included in the autonomous driving vehicle 100*b* as a component thereof, but it may be implemented with separate hardware and connected to the outside of the autonomous driving vehicle 100*b*.

The autonomous driving vehicle 100*b* may obtain state information about the autonomous driving vehicle 100*b* based on sensor information acquired from various types of sensors, detect (recognize) a surrounding environment and objects, generate map data, determine a travel route and driving plan, or determine an operation.

Similarly to the robot 100*a*, the autonomous driving vehicle 100*b* may use the sensor information obtained from at least one of the following sensors: a LIDAR, a radar, and a camera so as to determine the travel route and driving plan.

In particular, the autonomous driving vehicle 100*b* may recognize an environment and objects in an area hidden from view or an area over a certain distance by receiving the sensor information from external devices. Alternatively, the autonomous driving vehicle 100*b* may receive information, which is recognized by the external devices.

The autonomous driving vehicle 100*b* may perform the above-described operations based on a learning model configured with at least one ANN. For example, the autonomous driving vehicle 100*b* may recognize the surrounding environment and objects based on the learning model and determine the driving path based on the recognized surrounding environment and objects. The learning model may be trained by the autonomous driving vehicle 100*a* or an external device such as the AI server 200.

The autonomous driving vehicle 100*b* may operate by directly generating a result based on the learning model. Alternatively, the autonomous driving vehicle 100*b* may transmit sensor information to the external device such as the AI server 200 and receive a result generated based on the sensor information.

The autonomous driving vehicle 100*b* may determine the travel route and driving plan based on at least one of the map data, the object information detected from the sensor information, or the object information obtained from the external device. Then, the autonomous driving vehicle 100*b* may move according to the determined travel path and driving plan under control of its driving unit.

The map data may include object identification information about various objects placed in a space (e.g., road) in which the autonomous driving vehicle 100*b* moves. For example, the map data may include object identification information about fixed objects such as street lamps, rocks, and buildings and movable objects such as vehicles and pedestrians. The object identification information may include a name, a type, a distance, a position, etc.

The autonomous driving vehicle 100*b* may operate and move by controlling the driving unit based on the user control/interaction. In this case, the autonomous driving vehicle 100*b* may obtain intention information from the motion or speech of a user and determine a response based on the obtained intention information.

<AI+XR>

When the AI technology is applied to the XR device 100*c*, the XR device 100*c* may be implemented as a HMD, a HUD mounted in vehicles, a TV, a mobile phone, a smartphone, a computer, a wearable device, a home appliance, a digital signage, a vehicle, a fixed robot, a mobile robot, etc.

The XR device 100*c* may analyze three-dimensional point cloud data or image data obtained from various sensors or external devices, generate position data and attribute data for three-dimensional points, obtain information about a surrounding environment or information about a real object, perform rendering to on an XR object, and then output the XR object. For example, the XR device 100*c* may output an XR object including information about a recognized object, that is, by matching the XR object with the recognized object.

The XR device 100*c* may perform the above-described operations based on a learning model configured with at least one ANN. For example, the XR device 100*c* may recognize the real object from the three-dimensional point cloud data or image data based on the learning model and provide information corresponding to the recognized real object. The learning model may be directly trained by the XR device 100*c* or an external device such as the AI server 200.

The XR device 100*c* may operate by directly generating a result based on the learning model. Alternatively, the XR device 100*c* may transmit sensor information to the external device such as the AI server 200 and receive a result generated based on the sensor information.

<AI+Robot+Autonomous Driving>

When the AI technology and the autonomous driving technology are applied to the robot 100*a*, the robot 100*a* may be implemented as a guide robot, a transport robot, a cleaning robot, a wearable robot, an entertainment robot, a pet robot, an unmanned flying robot, etc.

The robot 100*a* to which the AI technology and the autonomous driving technology are applied may refer to the robot 100*a* with the autonomous driving function or the robot 100*a* interacting with the autonomous driving vehicle 100*b*.

The robot 100*a* having the autonomous driving function may be collectively referred to as a device that move along a given movement path without human control or a device that moves by autonomously determining its movement path.

The robot 100*a* having the autonomous driving function and the autonomous driving vehicle 100*b* may use a common sensing method to determine either a travel route or a driving plan. For example, the robot 100*a* having the autonomous driving function and the autonomous driving vehicle 100*b* may determine either the travel route or the driving plan based on information sensed through a LIDAR, a radar, and a camera.

The robot 100*a* interacting with the autonomous driving vehicle 100*b* may exist separately from with the autonomous driving vehicle 100*b*. That is, the robot 100*a* may perform operations associated with the autonomous driving function inside or outside the autonomous driving vehicle 100*b* or interwork with a user on the autonomous driving vehicle 100*b*.

The robot 100*a* interacting with the autonomous driving vehicle 100*b* may control or assist the autonomous driving function of the autonomous driving vehicle 100*b* by obtaining sensor information on behalf of the autonomous driving vehicle 100*b* and providing the sensor information to the autonomous driving vehicle 100*b* or by obtaining sensor information, generating environment information or object information, and providing the information to the autonomous driving vehicle 100*b*.

Alternatively, the robot 100*a* interacting with the autonomous driving vehicle 100*b* may monitor the user on the autonomous driving vehicle 100*b* or control the autonomous driving vehicle 100b through the interaction with the user. For example, when it is determined that the driver is in a drowsy state, the robot 100a may activate the autonomous driving function of the autonomous driving vehicle 100b or assist the control of the driving unit of the autonomous driving vehicle 100b. The function of the autonomous driving vehicle 100b controlled by the robot 100a may include not only the autonomous driving function but also functions installed in the navigation system or audio system provided in the autonomous driving vehicle 100b.

Alternatively, the robot 100a interacting with the autonomous driving vehicle 100b may provide information to the autonomous driving vehicle 100b outside the autonomous driving vehicle 100b or assist the autonomous driving vehicle 100b outside the autonomous driving vehicle 100b. For example, the robot 100a may provide traffic information including signal information such as smart traffic lights to the autonomous driving vehicle 100b or automatically connect an electric charger to a charging port by interacting with the autonomous driving vehicle 100b like an automatic electric charger installed in an electric vehicle.

<AI+Robot+XR>

When the AI technology and the XR technology are applied to the robot 100a, the robot 100a may be implemented as a guide robot, a transport robot, a cleaning robot, a wearable robot, an entertainment robot, a pet robot, an unmanned flying robot, a drone, etc.

The robot 100a to which the XR technology is applied may refer to a robot subjected to control/interaction in an XR image. In this case, the robot 100a may be separated from the XR device 100c but interact with the XR device 100c.

When the robot 100a subjected to control/interaction in the XR image obtains sensor information from sensors including a camera, the robot 100a or XR device 100c may generate the XR image based on the sensor information, and then the XR device 100c may output the generated XR image. The robot 100a may operate based on a control signal input through the XR device 100c or user interaction.

For example, a user may confirm the XR image corresponding to the perspective of the robot 100a remotely controlled through an external device such as the XR device 100c. Then, the user may adjust the autonomous driving path of the robot 100a or control the operation or movement of the robot 100a through interaction therewith or check information about surrounding objects.

<AI+Autonomous Driving+XR>

When the AI technology and the XR technology is applied to the autonomous driving vehicle 100b, the autonomous driving vehicle 100b may be implemented as a mobile robot, a vehicle, an unmanned flying vehicle, etc.

The autonomous driving vehicle 100b to which the XR technology is applied may refer to an autonomous driving vehicle capable of providing an XR image or an autonomous driving vehicle subjected to control/interaction in an XR image. In particular, the autonomous driving vehicle 100b subjected to control/interaction in the XR image may be separated from the XR device 100c but interact with the XR device 100c.

The autonomous driving vehicle 100b capable of providing the XR image may obtain sensor information from sensors including a camera and output the generated XR image based on the obtained sensor information. For example, the autonomous driving vehicle 100b may include an HUD for outputting an XR image, thereby providing a user with an XR object corresponding to an object in the screen together with a real object.

When the XR object is displayed on the HUD, at least part of the XR object may overlap with the real object which the user looks at. On the other hand, when the XR object is displayed on a display provided in the autonomous driving vehicle 100b, at least part of the XR object may overlap with the object in the screen. For example, the autonomous driving vehicle 100b may output XR objects corresponding to objects such as a lane, another vehicle, a traffic light, a traffic sign, a two-wheeled vehicle, a pedestrian, a building, etc.

When the autonomous driving vehicle 100b subjected to control/interaction in the XR image may obtain the sensor information from the sensors including the camera, the autonomous driving vehicle 100b or the XR device 100c may generate the XR image based on the sensor information, and then the XR device 100c may output the generated XR image. The autonomous driving vehicle 100b may operate based on a control signal input through an external device such as the XR device 100c or user interaction.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the embodiments of the present disclosure, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'mobile station (MS)', 'mobile subscriber station (MSS)', 'mobile terminal', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

Although the method and device for transmitting and receiving UL signals for positioning according to the present disclosure have been disclosed centering upon examples applied to 5th generation NewRAT systems, the above-mentioned embodiments of the present disclosure can also be applied to various wireless communication systems as well as the NewRAT systems.

The invention claimed is:

1. A method for transmitting an uplink (UL) reference signal for positioning by a user equipment (UE) in a wireless communication system comprising:
   determining a first power value for a first UL reference signal and a second power value for a second UL reference signal;
   transmitting the first UL reference signal through a first resource based on the first power value; and
   transmitting the second UL reference signal through a second resource based on the second power value, wherein,
   the first power value and the second power value are different from each other;
   the first resource and the second resource are different from each other; and
   UL signals other than the second UL reference signal are muted in the second resource.

2. The method according to claim 1, wherein:
   the first power value is determined based on a pathloss value of a serving cell; and
   the second power value is maximum power of the UE.

3. The method according to claim 1, wherein:
   the first power value is determined based on a pathloss value of a serving cell; and
   the second power value is determined based on a pathloss value of a base station (BS) located farthest from the UE.

4. The method according to claim 1, wherein:
   the first power value is determined based on a pathloss value of a base station (BS) located closest to the UE; and
   the second power value is maximum power of the UE.

5. The method according to claim 1, wherein:
   the first power value is determined based on a pathloss value of a base station (BS) located closest to the UE; and
   the second power value is determined based on a pathloss value of a base station (BS) located farthest from the UE.

6. The method according to claim 1, further comprising:
   determining a third power value for a third UL reference signal,
   wherein the third power value is different from the first power value and the second power value; and
   a third resource for the third UL reference signal is different from the first resource and the second resource.

7. The method according to claim 6, wherein:
   the first power value is determined based on a pathloss value of a base station (BS) located closest to the UE;
   the second power value is determined based on a pathloss value of a serving cell; and
   the third power value is maximum power of the UE.

8. The method according to claim 6, wherein:
   the first power value is determined based on a pathloss value of a base station (BS) located closest to the UE;
   the second power value is determined based on a pathloss value of a serving cell; and
   the third power value is determined based on a pathloss value of a base station (BS) located farthest from the UE.

9. The method according to claim 1, wherein:
   the first UL reference signal is used for at least one first base station (BS) located within a predetermined distance from the UE; and
   the second UL reference signal is used for at least one second base station (BS) located outside the predetermined distance from the UE.

10. The method according to claim 1, wherein:
    the first UL reference signal and the second UL reference signal are an Uplink Positioning Reference Signal (UL-PRS) or a Sounding Reference Signal (SRS).

11. The method according to claim 1, wherein:
    the UE is configured to communicate with at least one of another UE other than the UE, a network, a base station (BS), and an autonomous vehicle.

12. A device for transmitting an uplink (UL) reference signal for positioning in a wireless communication system comprising:
    at least one processor; and
    at least one computer memory operably connectable to the at least one processor and storing instructions that, when executed, cause the at least one processor to perform operations comprising:
    determining a first power value for a first UL reference signal and a second power value for a second UL reference signal;
    transmitting the first UL reference signal through a first resource based on the first power value; and
    transmitting the second UL reference signal through a second resource based on the second power value, wherein,
    the first power value and the second power value are different from each other;
    the first resource and the second resource are different from each other; and
    UL signals other than the second UL reference signal are muted in the second resource.

13. A user equipment (UE) for transmitting an uplink (UL) reference signal for positioning in a wireless communication system comprising:
    at least one transceiver;
    at least one processor; and
    at least one computer memory operably connectable to the at least one processor and storing instructions that, when executed, cause the at least one processor to perform operations comprising:
    determining a first power value for a first UL reference signal and a second power value for a second UL reference signal;
    transmitting, by the at least one transceiver, the first UL reference signal through a first resource based on the first power value; and
    transmitting, by the at least one transceiver, the second UL reference signal through a second resource based on the second power value, wherein,
    the first power value and the second power value are different from each other;
    the first resource and the second resource are different from each other; and
    UL signals other than the second UL reference signal are muted in the second resource.

* * * * *